United States Patent
Ishikawa et al.

(10) Patent No.: US 12,241,758 B2
(45) Date of Patent: Mar. 4, 2025

(54) GROUND SURFACE ESTIMATION METHOD, MEASUREMENT REGION DISPLAY SYSTEM, AND CRANE

(71) Applicants: TADANO LTD., Kagawa (JP); THE SCHOOL CORPORATION KANSAI UNIVERSITY, Osaka (JP)

(72) Inventors: Iwao Ishikawa, Kagawa (JP); Takayuki Kosaka, Kagawa (JP); Satoshi Kubota, Osaka (JP); Shigenori Tanaka, Osaka (JP); Kenji Nakamura, Osaka (JP); Yuhei Yamamoto, Osaka (JP); Masaya Nakahara, Osaka (JP)

(73) Assignees: TADANO LTD., Kagawa (JP); THE SCHOOL CORPORATION KANSAI UNIVERSITY, Osaka (JP)

( * ) Notice: Subject to any disclaimer, the term of this patent is extended or adjusted under 35 U.S.C. 154(b) by 551 days.

(21) Appl. No.: 17/296,807

(22) PCT Filed: Dec. 9, 2019

(86) PCT No.: PCT/JP2019/048143
§ 371 (c)(1),
(2) Date: May 25, 2021

(87) PCT Pub. No.: WO2020/122028
PCT Pub. Date: Jun. 18, 2020

(65) Prior Publication Data
US 2022/0003544 A1    Jan. 6, 2022

(30) Foreign Application Priority Data
Dec. 10, 2018  (JP) .................................. 2018-231049

(51) Int. Cl.
*G01C 7/02*    (2006.01)
*B66C 13/22*   (2006.01)

(52) U.S. Cl.
CPC ................ *G01C 7/02* (2013.01); *B66C 13/22* (2013.01); *B66C 2700/08* (2013.01)

(58) Field of Classification Search
CPC ..... B66C 2700/08; G01S 17/89; G01S 17/88; G01S 17/003; G01S 17/06; G01S 17/08; G01S 17/66; G01S 7/51
See application file for complete search history.

(56) References Cited

U.S. PATENT DOCUMENTS

2013/0218472 A1    8/2013  Fu et al.
2015/0170526 A1    6/2015  Wang et al.

FOREIGN PATENT DOCUMENTS

JP    2002-366977 A    12/2002
JP    2013-120176 A    6/2013
(Continued)

OTHER PUBLICATIONS

Alireza Asvadi, Cristiano Premebida, Paulo Peixoto, Urbano Nunes, 3D Lidar-based static and moving obstacle detection in driving environments, Robotics and Autonomous Systems, 83, 2016, pp. 299-311 (Year: 2016).*
(Continued)

*Primary Examiner* — Son T Le
*Assistant Examiner* — Brian Butler Geiss
(74) *Attorney, Agent, or Firm* — Paratus Law Group, PLLC

(57) ABSTRACT

A ground surface estimation method includes: a continuous region recognizing step for recognizing, when a difference in altitude value between a representative point of one grid and a representative point of another adjacent grid out of the plurality of grids is equal to or less than a threshold, the one grid and the other adjacent grid as a continuous region that is a region where the one grid and the other adjacent grid are continuous; and a ground surface estimation step for esti-
(Continued)

mating a continuous region having the largest number of grids among the continuous regions as a ground surface.

8 Claims, 21 Drawing Sheets

(56) References Cited

FOREIGN PATENT DOCUMENTS

| JP | 2014-048236 A | | 3/2014 |
|----|---------------|---|--------|
| JP | 2016142535 A | * | 8/2016 |
| JP | 6514901 B2 | * | 5/2019 |

OTHER PUBLICATIONS

Steinemann, P., Klappstein, J., Dickmann, J., von Hundelshausen, F., & Wünsche, H. J. (May 2012). Geometric-model-free tracking of extended targets using 3D lidar measurements. In Laser Radar Technology and Applications XVII (vol. 8379, pp. 104-115) (Year: 2012).*
Feb. 18, 2020, International Search Report issued for related PCT Application No. PCT/JP2019/048143.
Feb. 18, 2020, International Search Opinion issued for related PCT Application No. PCT/JP2019/048143.
Jul. 19, 2022, European Search Report issued for related EP Application No. 19894484.5.
Fang et al., A framework for real-time pro-active safety assistance for mobile crane lifting operations, Automation in Construction, 2016, pp. 367-379, vol. 72.

* cited by examiner

GROUND SURFACE ESTIMATION METHOD, MEASUREMENT REGION DISPLAY SYSTEM, AND CRANE

CROSS REFERENCE TO PRIOR APPLICATION

This application is a National Stage Patent Application of PCT International Patent Application No. PCT/JP2019/048143 (filed on Dec. 9, 2019) under 35 U.S.C. § 371, which claims priority to Japanese Patent Application No. 2018-231049 (filed on Dec. 10, 2018), which are all hereby incorporated by reference in their entirety.

TECHNICAL FIELD

The present invention relates to aground surface estimation method, a measurement region display system, and a crane.

BACKGROUND ART

In the related art, there is known a technique for making crane work efficient by confirming a load and a state around a load based on guide information displayed on a monitor. Such a technique is disclosed, for example, in Patent Literature (hereinafter, referred to as "PTL") 1 described below.

PTL 1 discloses a technique relating to a height information notification system that notifies a height of an object around a suspended load (load). The height information notification system that notifies height information on an object around a suspended load described in PTL 1 is configured such that a distance between a distal end of a boom and a periphery of a suspended load is measured by a distance measurement section such as a laser distance sensor, a microwave distance sensor, and a stereo camera, and then the position of the object around the suspended load is detected by using distance measurement results, the height thereof is calculated, a processing image (guide information) obtained by associating the position and height of the object around the suspended load with a taken image (camera image) taken (captured) by a camera is created (generated), and the processing image is displayed on a monitor.

However, the related art described in PTL 1 is configured to measure a distance between a distal end of a boom and a periphery of a suspended load and to calculate the height of an object around the suspended load by using the distance. That is, in the related art, the height of a feature is calculated by using the height of a point, at which measurement is locally performed around a suspended load, as the height of a ground surface. For this reason, in a case where there is a place where a ground surface is inclined from and higher than a point at which measurement is performed around a suspended load, the height of the place may be displayed as the height from the measurement point around the suspended load, and an operator may erroneously recognize that there is a feature having that height.

CITATION LIST

Patent Literature

PTL 1
Japanese Patent Application Laid-Open No. 2013-120176

SUMMARY OF INVENTION

Technical Problem

An object of the present invention is to provide aground surface estimation method, a measurement region display system, and a crane which are capable of recognizing a ground surface as a continuous ground surface even when the height of the ground surface varies due to inclination and/or unevenness.

Solution to Problem

The problem to be solved by the present invention is as described above. Next, a solution to the problem will be described.

That is, a ground surface estimation method according to the present invention includes: acquiring, by a laser scanner, point cloud data by radiating laser on a measurement region, and calculating an altitude value of a radiation point from the point cloud data; generating, by a data processing section that performs arithmetic processing on the point cloud data, a grid by dividing the measurement region into a plurality of grids, calculating a center-of-gravity position of each of the grids and an average altitude value of the point cloud data in each of the grids, and setting the center-of-gravity position at the average altitude value as a position of a representative point for each of the grids, recognizing, by the data processing section, a continuous region by recognizing one grid and another adjacent grid of the plurality of grids as the continuous region when a difference in altitude value between the representative point of the one grid and the representative point of the other adjacent grid is equal to or less than a threshold, the continuous region being a region where the one grid and the other adjacent grid are continuous; and estimating, by the data processing section, a ground surface by estimating the continuous region having a largest number of the grids among the continuous regions as the ground surface.

In the ground surface estimation method according to the present invention, in the generating of the grid, each of the grids is sliced in a horizontal direction and the average altitude value of the point cloud data within a range is calculated, the range being formed by slicing each of the grids.

In the ground surface estimation method according to the present invention, in the recognizing of the continuous region, the threshold is changed in accordance with a distance between the laser scanner and the representative point.

In the ground surface estimation method according to the present invention, in the generating of the grid, a width of the grid is changed in accordance with a number of the continuous regions within a predetermined range of the measurement region.

A measurement region display system according to the present invention includes: a data acquisition section including a laser scanner, the laser scanner acquiring point cloud data by radiating laser on a measurement region; a data processing section that performs arithmetic processing on the acquired point cloud data; and a data display section. The data processing section acquires the point cloud data from the data acquisition section, and calculates an altitude value of a radiation point from the point cloud data; divides the measurement region into a plurality of grids, calculates a center-of-gravity position of each of the grids and an average altitude value of the point cloud data in each of the grids, and sets the center-of-gravity position at the average altitude value as a position of a representative point for each of the grids; recognizes one grid and another adjacent grid of the plurality of grids as a continuous region when a difference in altitude value between the representative point of the one grid and the representative point of the other adjacent grid is equal to or less than a threshold, the continuous region being a region where the one grid and the other adjacent grid are continuous; estimates the continuous region having a largest number of the grids among the continuous regions as a ground surface; and displays the continuous region estimated as the ground surface on the data display section, the continuous region estimated as the ground surface being distinguished from the continuous region other than the continuous region estimated as the ground surface.

A crane according to the present invention includes: a swivel base; a boom provided on the swivel base; a laser scanner attached to the boom and acquiring point cloud data; a control apparatus that performs arithmetic processing on the acquired point cloud data; and a display apparatus. The point cloud data for each position of the laser scanner when radiating laser is acquired by laser radiation while the laser scanner is caused to move in accordance with a swiveling operation of the swivel base, an extending and retracting operation of the boom, and/or a luffing operation of the boom. The control apparatus acquires the point cloud data for each position of the laser scanner when radiating the laser, superimposes the point cloud data for each position of the laser scanner when radiating the laser based on each position and attitude of the laser scanner when radiating the laser, and calculates an altitude value of a radiation point; divides a measurement region into a plurality of grids, calculates a center-of-gravity position of each of the grids and an average altitude value of the point cloud data in each of the grids, and sets the center-of-gravity position at the average altitude value as a position of a representative point for each of the grids; recognizes one grid and another adjacent grid of the plurality of grids as a continuous region when a difference in altitude value between the representative point of the one grid and the representative point of the other adjacent grid is equal to or less than a threshold, the continuous region being a region where the one grid and the other adjacent grid are continuous; estimates the continuous region having a largest number of the grids among the continuous regions as a ground surface; and displays the continuous region estimated as the ground surface on the display apparatus, the continuous region estimated as the ground surface being distinguished from the continuous region other than the continuous region estimated as the ground surface.

Advantageous Effects of Invention

The present invention achieves effects as indicated below.

According to the present invention, a region in which a difference in altitude value is within a threshold is recognized as a continuous region so that even a region where the altitude value changes continuously, such as an inclined surface, and even a region having unevenness with a height within the threshold are recognized as continuous regions. Thus, a ground surface is recognized as a continuous ground surface even when the height of the ground surface varies due to inclination and/or unevenness.

According to the present invention, even in a case where a ground surface has unevenness and laser is radiated on a side surface of the unevenness of the ground surface, an altitude value is calculated by using point cloud data estimated to have been acquired by radiating laser on an upper surface of the unevenness of the ground surface. Thus, even when a ground surface has unevenness, an upper surface of the unevenness of the ground surface can be recognized as the ground surface.

According to the present invention, a continuous region for which variations in measurement results are taken into more consideration is recognized by changing the threshold to that in consideration of measurement errors in point cloud data. Thus, a ground surface is recognized as a continuous ground surface even when the height of the ground surface varies due to inclination and/or unevenness.

According to the present invention, even in a case where a region of a ground surface becomes smaller, the smaller region of the ground surface is recognized by reducing a grid width. Thus, a ground surface is recognized as a continuous ground surface even when the height of the ground surface varies due to inclination and/or unevenness.

According to the present invention, point cloud data in a work region of a crane is acquired in accordance with operations of a swivel base and/or a boom, and a region in which a difference in altitude value is within the threshold is recognized as a continuous region so that even when there are a wide-range region where the altitude value changes continuously and a wide-range region having unevenness with a height within the threshold, the regions are recognized as continuous regions. Thus, a ground surface is recognized as a continuous ground surface even when the height of the ground surface varies due to inclination and/or unevenness in a work region of a crane.

BRIEF DESCRIPTION OF DRAWINGS

FIG. 3A is a schematic diagram along a Y-axis direction, and FIG. 3B is a schematic diagram along a Z-axis direction:

FIG. 6A is diagrams for describing division of point cloud data, grid slicing, and average altitude value calculation, and FIG. 6B is a diagram for describing representative point setting;

FIG. 7A is diagrams for describing a representative point set for each grid and a representative point for each grid on a three-dimensional map generated prior to a current time, and FIG. 7B is a diagram for describing representative point deletion in a case where a plurality of representative points is present in one grid;

FIGS. 9A to 9E are diagrams for describing labeling processing, where FIG. 9A is a schematic diagram of grids of the three-dimensional map, FIG. 9B is a diagram for describing label giving, FIG. 9C is a diagram for describing a time when the label giving is completed, FIG. 9D is a diagram for describing a label before overwriting, and FIG. 9E is a diagram for describing the label after overwriting:

FIG. 10A illustrates a continuous region of label No. 4, a continuous region of label No. 6, and surrounding regions thereof, FIG. 10B is a diagram for describing average values of altitude values, and FIG. 10C is a diagram for describing estimation of a feature and a ground surface:

FIG. 11A illustrates a data display section displaying a camera image, and FIG. 1/B illustrates the data display section displaying the camera image and the guide information in an overlapping manner:

FIG. 17A is a schematic diagram of the radiation state of laser by the laser scanner along an X-axis direction, and FIG. 17B is a schematic diagram of the grids of the three-dimensional map:

FIG. 18A is a schematic diagram of the crane along the Y-axis direction and a schematic plan view of the crane, and FIG. 18B is schematic diagrams of the crane along the Y-axis direction.

FIG. 20A is diagrams for describing a predetermined range and continuous regions within the range, and FIG. 20B is a diagram for describing a region of the ground surface after changing the grid width.

DESCRIPTION OF EMBODIMENTS

Hereinafter, crane 1 including measurement region display system 50 according to Embodiment 1 of the present invention will be described. Note that, in the present embodiment, a mobile crane (rough terrain crane) will be described as crane 1, but may also be a truck crane or the like.

Figure 1:
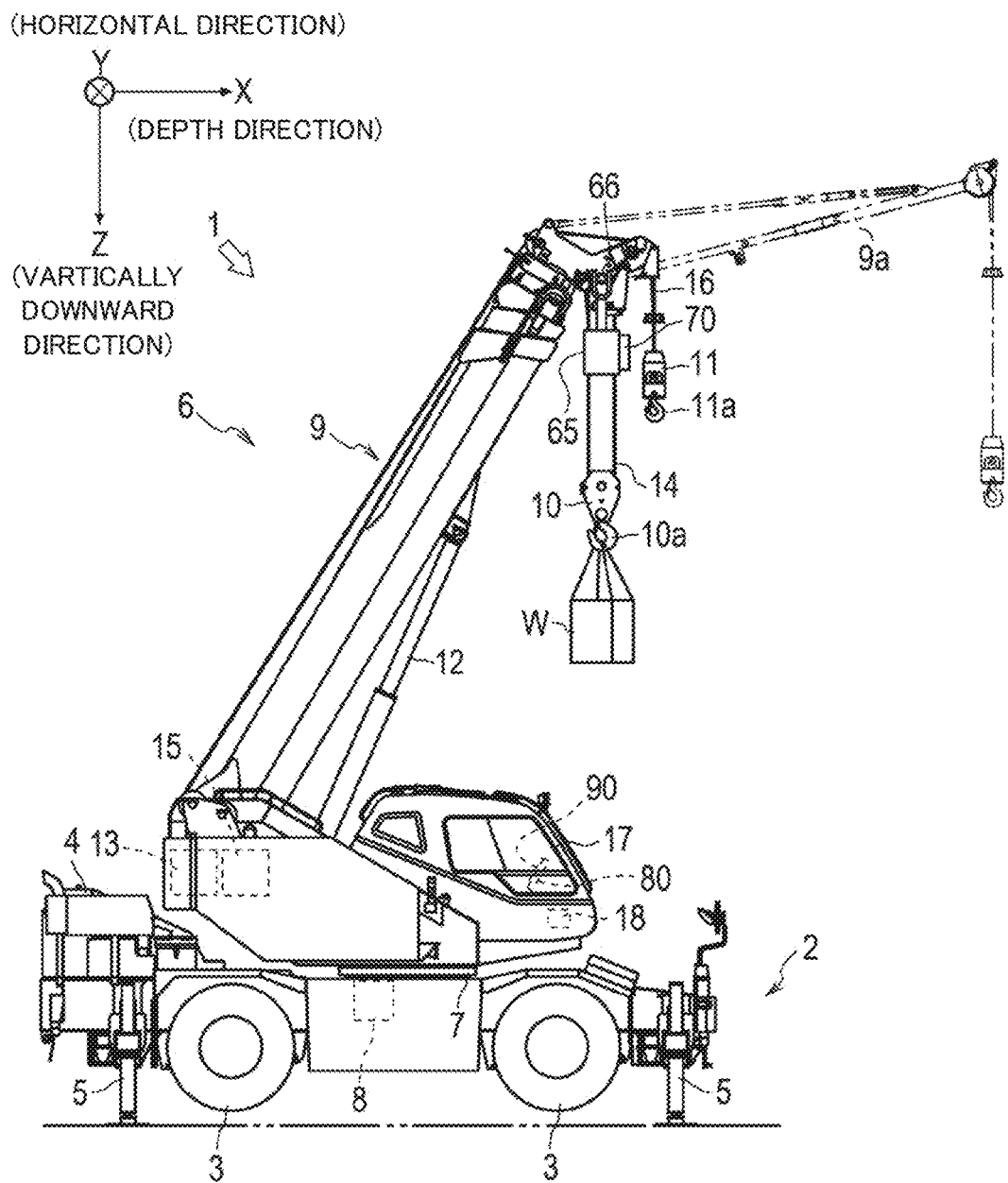
FIG. 1 is a schematic diagram illustrating an overall configuration of a crane according to an embodiment of the present invention.

As illustrated in FIG. 1, crane 1 is a mobile crane capable of moving to an unspecified location. Crane 1 includes vehicle 2 and crane apparatus 6.

Vehicle 2 is a traveling vehicle that transports crane apparatus 6. Vehicle 2 includes a plurality of wheels 3, and travels using engine 4 as a power source. Vehicle 2 is provided with outrigger 5. Outrigger 5 is formed of an overhang beam that can be extended onto both sides of vehicle 2 in a width direction by hydraulic pressure, and a hydraulic jack cylinder that can be extended in a direction perpendicular to the ground.

Crane apparatus 6 is a work apparatus that suspends load W by a wire rope. Crane apparatus 6 includes swivel base 7, boom 9, jib 9a, main hook block 10, sub-hook block 11, luffing hydraulic cylinder 12, main winch 13, main wire rope 14, sub-winch 15, sub-wire rope 16, cabin 17, control apparatus 18 (see FIG. 2), and the like.

Swivel base 7 is a driving apparatus that configures crane apparatus 6 to be swivelable. Swivel base 7 is provided on a frame of vehicle 2 via an annular bearing. Swivel base 7 is configured to be rotatable around a center of the annular bearing as a rotation center. Swivel base 7 is provided with hydraulic swivel motor 8 which is an actuator and which is of hydraulic type.

Hydraulic swivel motor 8 is an actuator that is rotationally operated by swivel valve 23 (see FIG. 2) that is an electromagnetic proportional switching valve. Swivel valve 23 can control the flow rate of hydraulic oil, which is supplied to hydraulic swivel motor 8, to any flow rate. That is, swivel base 7 is configured to be controllable to have an arbitrary swivel speed via hydraulic swivel motor 8 that is rotationally operated by swivel valve 23. Swivel base 7 is provided with swivel sensor 27 (see FIG. 2) that detects the swivel position (angle) and swivel speed of swivel base 7.

Boom 9 is a movable support that supports a wire rope in a state in which the wire rope can suspend load W. Boom 9 is formed of a plurality of boom members. Boom 9 is configured to be extendable and retractable in an axial direction by moving each boom member by using an extension/retraction hydraulic cylinder (not illustrated) that is an actuator. A base end of a base boom member of boom 9 is swingably provided at substantially a center of swivel base 7.

The extension/retraction hydraulic cylinder (not illustrated) is an actuator that is operated to extend and retract by extension/retraction valve 24 (see FIG. 2) that is an electromagnetic proportional switching valve. Extension/retraction valve 24 can control the flow rate of hydraulic oil, which is supplied to the extension/retraction hydraulic cylinder, to any flow rate. That is, boom 9 is configured to be controllable to have an arbitrary boom length by extension/retraction valve 24. Boom 9 is provided with extension/retraction sensor 28 (see FIG. 2) which is an extension/retraction length detection section that detects the length of boom 9.

Main hook block 10 and sub-hook block 11 are suspending tools that suspend load W. Main hook block 10 is provided with a plurality of hook sheaves around which main wire rope 14 is wound, and main hook 10a that suspends load W. Sub-hook block 11 is provided with sub-hook 11a that suspends load W.

Luffing hydraulic cylinder 12 is operated to extend and retract by luffing valve 25 (see FIG. 2) that is an electromagnetic proportional switching valve. Luffing valve 25 can control the flow rate of hydraulic oil, which is supplied to luffing hydraulic cylinder 12, to any flow rate. That is, boom 9 is configured to be controllable to have an arbitrary luffing speed by luffing valve 25. Boom 9 is provided with luffing sensor 29 (see FIG. 2) that is a swivel angle detection section that detects the luff-up angle of boom 9, a weight sensor that detects the weight of load W, and the like.

Main winch 13 and sub-winch 15 are winding apparatuses that feed in (wind up) and feed out (wind out) main wire rope 14 and sub-wire rope 16. Main winch 13 is configured such that a main drum, around which main wire rope 14 is wound, is rotated by a main hydraulic motor (not illustrated) that is an actuator. Sub-winch 15 is configured such that a sub drum, around which sub-wire rope 16 is wound, is rotated by a sub-hydraulic motor (not illustrated) that is an actuator.

The main hydraulic motor is operated to be rotated by main valve 26m (see FIG. 2) that is an electromagnetic proportional switching valve. Main valve 26m can control a flow rate of hydraulic oil, which is supplied to the main hydraulic motor, to any flow rate. That is, main winch 13 is configured to be controllable to have any feed-in speed and any feed-out speed by main valve 26m. Similarly, sub-winch 15 is configured to be controllable to have any feed-in speed and any feed-out speed by sub-valve 26s (see FIG. 2) that is an electromagnetic proportional switching valve. Main winch 13 and sub-winch 15 are provided with winding sensor 30 (see FIG. 2) that detects feed-out amounts of main wire rope 14 and sub-wire rope 16, respectively.

Cabin 17 covers a driver's seat. The driver's seat is provided with an operation tool for operating travelling of vehicle 2, swiveling operation tool 19 for operating crane apparatus 6, extension/retraction operation tool 20, luffing operation tool 21, main-drum operation tool 22m, sub-drum operation tool 22s, and the like (see FIG. 2). Swiveling operation tool 19 makes it possible to operate hydraulic swivel motor 8. Extension/retraction operation tool 20 makes it possible to operate the extension/retraction hydraulic cylinder. Luffing operation tool 21 makes it possible to operate luffing hydraulic cylinder 12. Main-drum operation tool 22m makes it possible to operate the main hydraulic motor. Sub-drum operation tool 22s makes it possible to operate the sub-hydraulic motor.

Crane 1 configured as described above can move crane apparatus 6 to any position by causing vehicle 2 to travel. Further, crane 1 can increase the lifting height and work radius of crane apparatus 6, by raising boom 9 to have any luff-up angle with luffing hydraulic cylinder 12 by means of operation of luffing operation tool 21, and by extending boom 9 to have any boom length by means of operation of extension/retraction operation tool 20. Further, crane 1 can transport load W by suspending load W with main-drum operation tool 22m or the like and by swiveling swivel base 7 by means of operation of swiveling operation tool 19.

Figure 2:
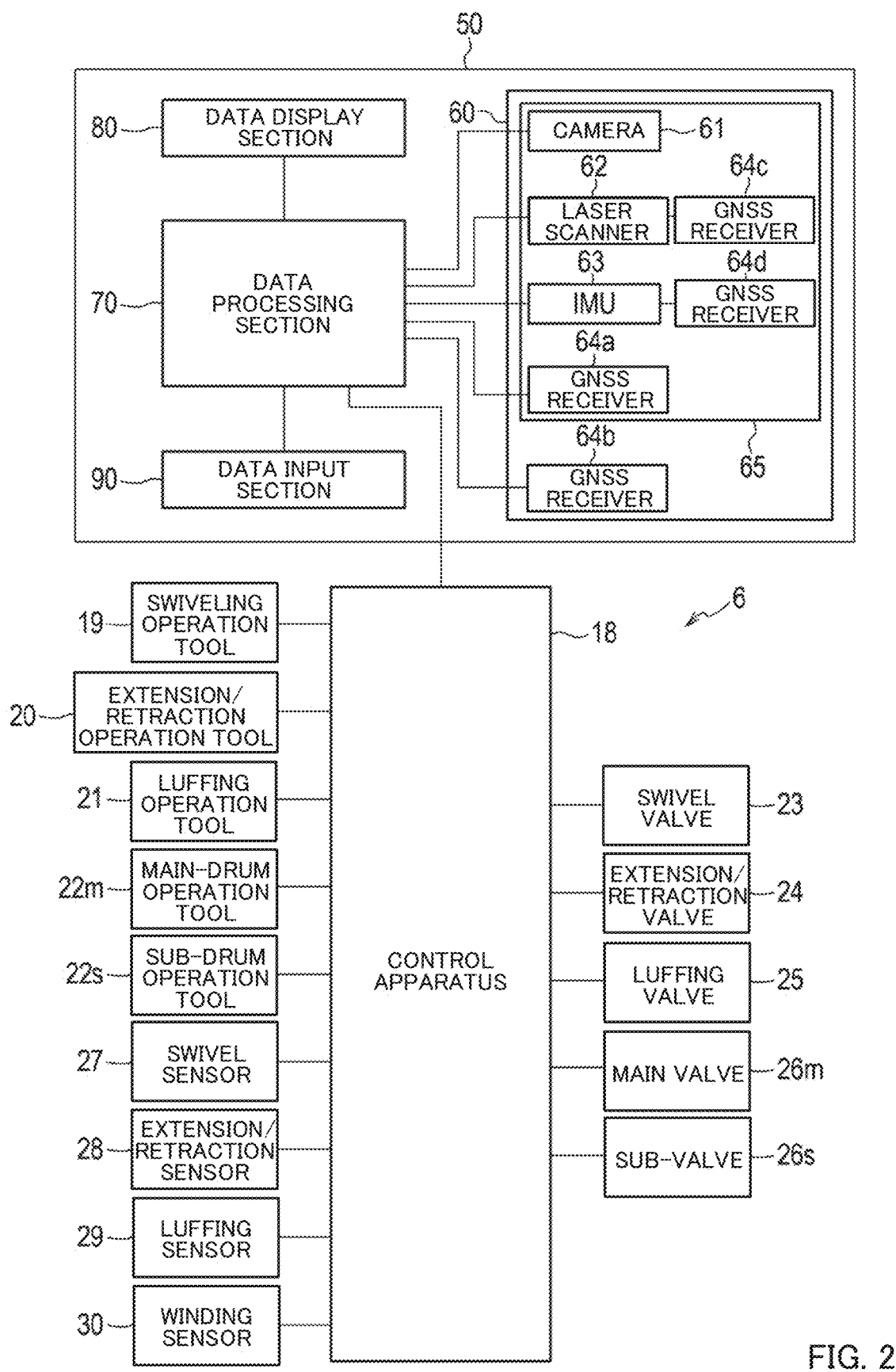
FIG. 2 is a schematic diagram illustrating a control configuration of a measurement region display system and the crane according to the embodiment of the present invention.

As illustrated in FIG. 2, control apparatus 18 controls the actuators of crane apparatus 6 via each valve. Control apparatus 18 is provided inside cabin 17. Substantively, control apparatus 18 may be configured such that a CPU, a ROM, a RAM, an HDD, and/or the like are connected to each another by a bus, or may be formed of a one-chip LSI or the like. Control apparatus 18 stores various programs and data for controlling operations of each actuator, sensor, or the like.

Control apparatus 18 is connected to swiveling operation tool 19, extension/retraction operation tool 20, luffing operation tool 21, main-drum operation tool 22m, and sub-drum operation tool 22s, and can acquire each operation amount of swiveling operation tool 19, extension/retraction operation tool 20, luffing operation tool 21, main-drum operation tool 22m, and sub-drum operation tool 22s.

Control apparatus 18 is connected to swivel valve 23, extension/retraction valve 24, luffing valve 25, main valve 26m, and sub-valve 26s, and can transmit a control signal to swivel valve 23, extension/retraction valve 24, luffing valve 25, main valve 26m, and sub-valve 26s.

Control apparatus 18 is connected to swivel sensor 27, extension/retraction sensor 28, luffing sensor 29, the weight sensor, and winding sensor 30, and can acquire the swivel position of swivel base 7, the boom length, the luff-up angle, the weight of load W, and the feed-out amounts of main wire rope 14 and sub-wire rope 16.

Control apparatus 18 can transmit information on crane 1, such as the swivel position of swivel base 7, the boom length, the luff-up angle, the weight of load W, and the feed-out amounts of main wire rope 14 and sub-wire rope 16, to measurement region display system 50.

Note that, in the present description, an XYZ coordinate system as illustrated in FIG. 1 is defined relative to an axial direction of a luff-up support of boom 9 (the same applies in the following description).

The X-axis direction (also referred to as "depth direction") is a direction perpendicular and horizontal to the axial direction of the luff-up support of boom 9. In addition, the Y-axis direction (also referred to as "horizontal direction") is a direction parallel and horizontal to the axial direction of the luff-up support of boom 9. Further, the Z-axis direction is a vertically downward direction. That is, the XYZ coordinate system is defined as a local coordinate system relative to boom 9 (see FIG. 4).

Next, measurement region display system 50 according to the embodiment of the present invention will be described.

Crane 1 includes measurement region display system 50 as illustrated in FIG. 2.

Measurement region display system 50 is a system that displays information (hereinafter, referred to as "guide information") on a region to be measured by measurement region display system 50 (hereinafter, the region will be referred to as "measurement region KA" (see FIG. 4)) as an image and presents the image to an operator in order to enable work by crane 1 as illustrated in FIG. 1 to be performed efficiently and safely, which is an example of measurement region display system 50 according to the present invention.

As illustrated in FIG. 2, measurement region display system 50 is formed of data acquisition section 60, data processing section 70, data display section 80, and data input section 90.

Data acquisition section 60 is a part that acquires data necessary to generate the guide information on measurement region KA, and includes camera 61, laser scanner 62, inertial measurement unit (IMU) 63, first GNSS receiver 64a, and second GNSS receiver 64b. Camera 61, laser scanner 62, inertial measurement unit (IMU) 63, and first GNSS receiver 64a are fixed to a frame body and integrally configure sensor unit 65.

Sensor unit 65 is attached to a distal end portion of boom 9 of crane 1, and is disposed in a state of being capable of capturing a situation directly below from the distal end portion of boom 9 located directly above load W (see FIG. 1). Note that, the concept "directly above" load W herein encompasses a position vertically above load W and a position of a certain range relative to the position vertically above load W (the certain range is, for example, a range of a top surface of load W).

Sensor unit 65 is attached to the distal end portion of boom 9 via gimbal 66 (see FIG. 1), and is configured such that an attitude of sensor unit 65 (an attitude toward the Z-axis direction) can be maintained substantially constant when a swiveling operation of swivel base 7, a luffing operation of boom 9 and/or an extension/retraction operation of boom 9 are performed. Thus, camera 61 and laser scanner 62 can be caused to face load W constantly. Accordingly, sensor unit 65 can constantly acquire data from load W and ground surface F below load W by camera 61 and laser scanner 62. Further, in a case where feature E is present on ground surface F below load W, sensor unit 65 can acquire data of feature E by camera 61 and laser scanner 62.

Camera 61 is a digital video camera for taking an image of a region below sensor unit 65 (hereinafter, the region will be referred to as "individual measurement region ka" (see FIG. 4)), and has a function of outputting a taken camera image to the outside in real time. Further, camera 61 has a number of pixels, an angle of view, a frame rate, and an image transmission rate in view of an amount of data necessary to generate appropriate guide information.

Laser scanner 62 is an apparatus that radiates laser on a measurement target object and receives reflected light of the laser from the measurement target object to thereby acquire information on a reflection point thereof and to acquire point cloud data of the measurement target object. Laser scanner 62 is attached to the distal end portion of boom 9 via sensor unit 65. Measurement target objects of laser scanner 62 are load W, feature E, and ground surface F. Further, third GNSS receiver 64c for acquiring a measurement time is connected to laser scanner 62.

Figure 3A:
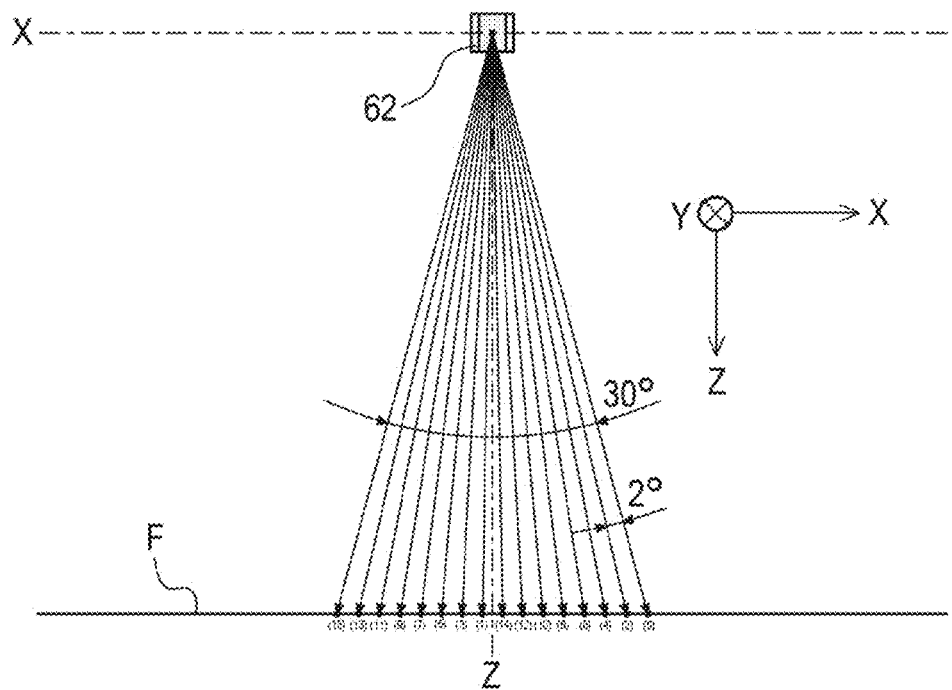
FIGS. 3A and 3B are diagrams for describing a radiation state of laser by a laser scanner, where
Figure 3B:
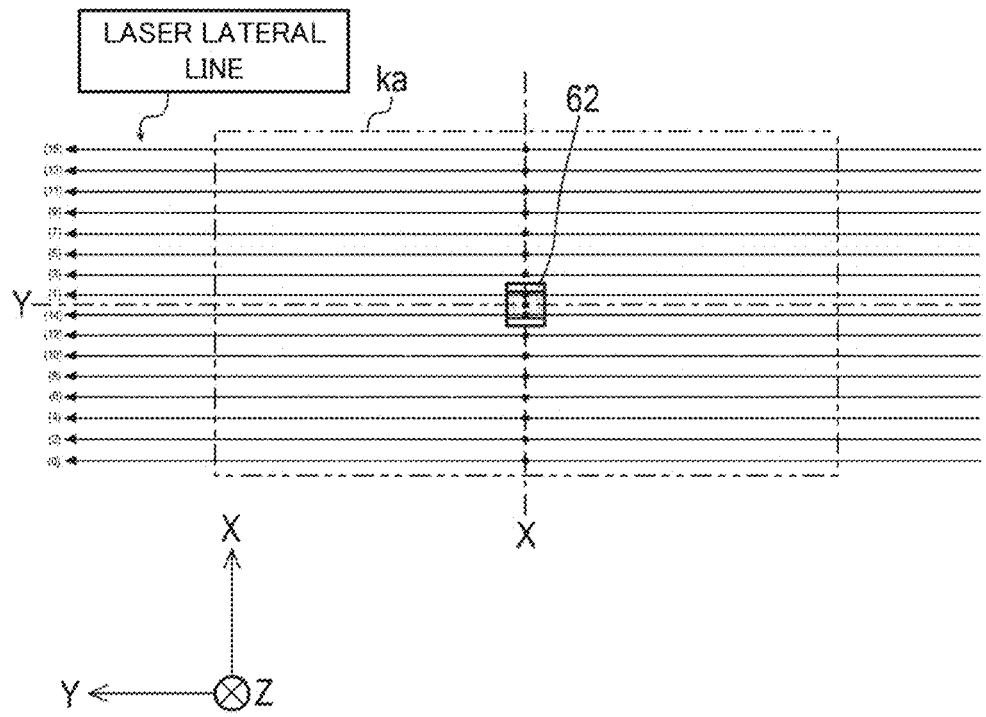

Further, laser scanner 62 is disposed such that trajectories of laser radiated toward individual measurement region ka become parallel to the Y-axis direction (see FIG. 3B). Further, laser scanner 62 is configured such that a reference axis for changing the radiation angle of laser is parallel to the X-axis direction.

Measurement region display system 50 acquires planar three-dimensional point cloud data in real time by laser scanner 62.

Inertial measurement unit (hereinafter, referred to as "IMU") 63 is an apparatus for acquiring attitude data of camera 61 and laser scanner 62 at the time of data acquisition. IMU 63 is capable of measuring an attitude angle in real time, and has a measurement accuracy available for correcting point cloud data acquired by laser scanner 62. Further, fourth GNSS receiver 64d for acquiring a measurement time is connected to IMU 63.

First GNSS receiver 64a is an apparatus for receiving a distance measuring radio wave from a satellite and calculating the latitude, the longitude, and the altitude value that are the coordinates. In data processing section 70, a separation distance between first GNSS receiver 64a and laser scanner 62 is set, and data processing section 70 is capable of calculating the coordinates of laser scanner 62 in real time based on the set distance.

Second GNSS receiver 64b is an apparatus for receiving a distance measuring radio wave from a satellite and calculating the latitude, the longitude, and the altitude value that are the coordinates. Second GNSS receiver 64b is disposed at a position of a swivel center of swivel base 7. Second GNSS receiver 64b is capable of calculating the coordinates of the swivel center of swivel base 7 in real time.

In the present embodiment, a RTK-GPS (Real Time Kinematic GPS) positioning system with high measurement accuracy is adopted for first GNSS receiver 64a and second GNSS receiver 64b. By adopting the RTK-GPS positioning system, it is possible to enhance the measurement accuracy of the position of laser scanner 62 and the position of the swivel center of swivel base 7. Note that, the RTK-GPS positioning system is not necessarily adopted, but any other positioning method may be adopted.

First GNSS receiver 64a is disposed such that a straight line connecting first GNSS receiver 64a and second GNSS receiver 64b, a measurement axis of laser scanner 62, and a measurement axis of IMU 63 are on the same straight line. Further, the orientation (azimuth) of laser scanner 62 can be calculated by forming a GNSS compass, in which boom 9 serves as a base line, with the coordinates of laser scanner 62 calculated by first GNSS receiver 64a and the coordinates of the swivel center of swivel base 7 calculated by second GNSS receiver 64b. First GNSS receiver 64a and second GNSS receiver 64b have a measurement accuracy available for correcting point cloud data acquired by laser scanner 62.

As illustrated in FIGS. 3A and 3B, laser scanner 62 is an apparatus which includes a total of 16 laser transmission/reception sensors, and which is capable of acquiring point cloud data of a measurement target object by radiating 16 laser beams on the measurement target object at the same time. As illustrated in FIG. 3A, the 16 laser transmission/reception sensors of laser scanner 62 are arranged with radiation angles shifted by two degrees in the X-axis direction, and are configured such that laser can be radiated on a measurement target object with a spread angle of 30 degrees in total. Further, each laser transmission/reception sensor of laser scanner 62 is configured to be capable of rotating 360 degrees (entire azimuth) around the X-axis. As illustrated in FIG. 3B, trajectories drawn by laser radiated toward individual measurement region ka are parallel to the Y-axis direction, and the trajectories drawn using laser scanner 62 are 16 trajectories that are drawn at the same time.

Note that, as laser scanner 62, a device capable of measuring the three-dimensional shape of a measurement target object from a maximum reachable height of boom 9 (for example, approximately 100 meters) is selected in view of the maximum reachable height of boom 9. Further, as laser scanner 62, a device having predetermined performances with respect to each specification regarding a measurement speed, the number of measurement points, a measurement accuracy and the like is selected in view of an amount of data and data accuracy necessary to generate appropriate guide information.

Note that, in the present embodiment, a case where laser scanner 62 including a total of 16 laser transmission/reception sensors is used is described as an example, but measurement region display system 50 according to the present invention is not limited by the number of laser transmission/reception sensors forming laser scanner 62. That is, in measurement region display system 50 according to the present invention, laser scanner 62 having optimal specifications is selected as appropriate in accordance with the maximum reachable height of boom 9 (jib 9a) of crane 1, or the like.

Data acquired from individual measurement region ka by sensor unit 65 includes image data, taken by camera 61, of load W, ground surface F below load W. and feature E present on ground surface F below load W. Further, the data acquired from individual measurement region ka by sensor unit 65 includes point cloud data acquired by scanning load W, ground surface F, and feature E by laser scanner 62. Note that, ground surface F herein widely encompasses surfaces serving as a transport source and a transport destination of load W, and encompasses not only a surface on the ground, but also a floor surface on a rooftop terrace of a building, a rooftop surface and the like.

Data processing section 70, which is a data processing section, is a part that performs arithmetic processing on data acquired by data acquisition section 60 to generate the guide information that is presented to an operator. In the present embodiment, data processing section 70 is formed of a general-purpose personal computer in which a predetermined data processing program is installed.

Further, data processing section 70 is electrically connected to control apparatus 18 of crane 1, and information on crane 1 output from control apparatus 18, such as the swivel position of swivel base 7, the boom length, the luff-up angle, the weight of load W, and the feed-out amounts of main wire rope 14 and sub-wire rope 16, is input to data processing section 70.

Data display section 80 is a part for displaying the guide information that is presented to an operator, and is formed of a display apparatus connected to data processing section 70.

Data display section 80 displays a three-dimensional map of measurement region KA and a camera image of individual measurement region ka in real time.

Here, measurement region KA and the guide information will be described.

Measurement region KA is a region for which the guide information is generated.

Figure 4:
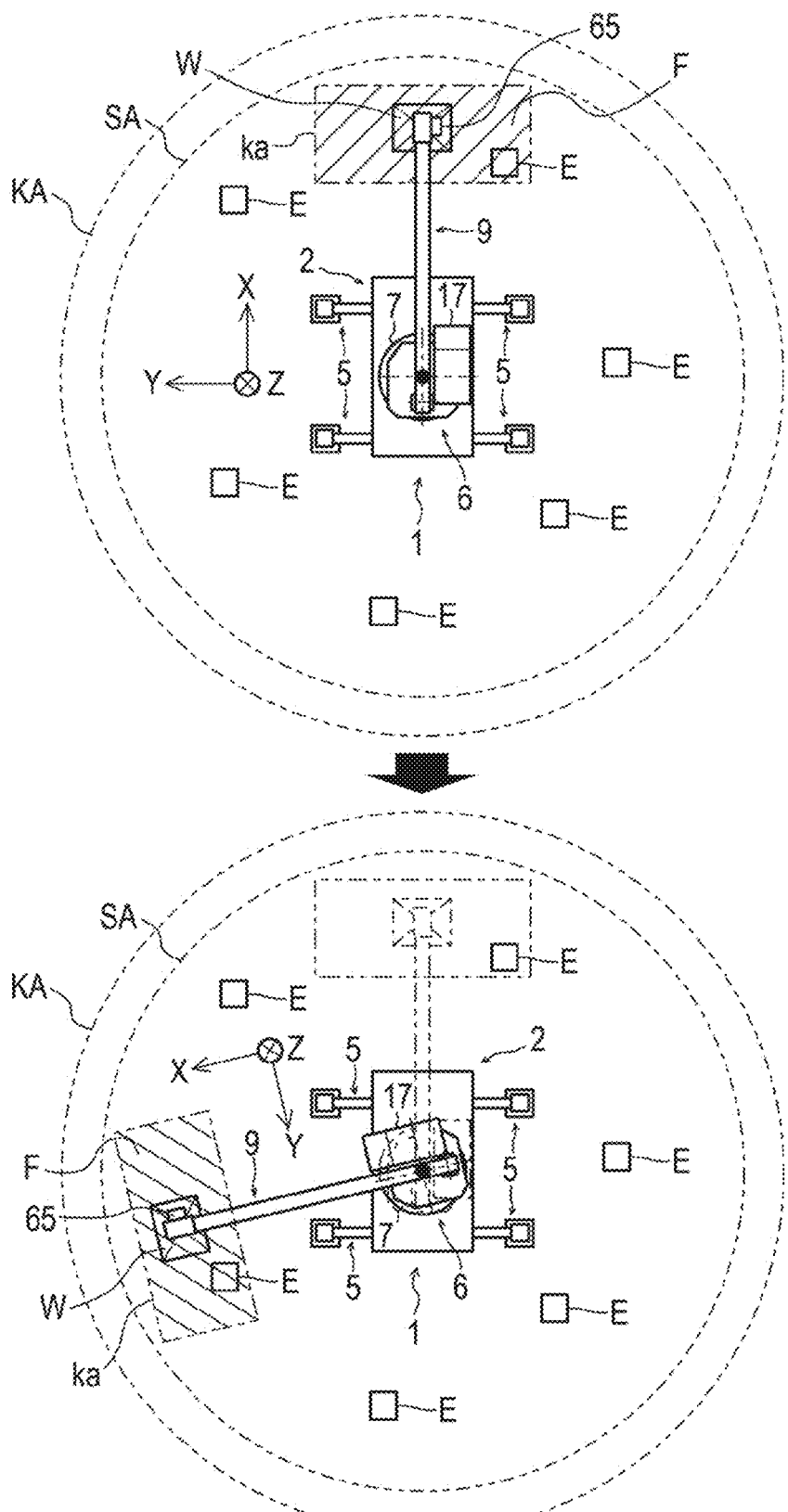
FIG. 4 is schematic plan views for describing a measurement region, an individual measurement region, and a work region.

As illustrated in FIG. 4, measurement region display system 50 measures load W, ground surface F. and feature E that are present on individual measurement region ka below sensor unit 65. Sensor unit 65 moves in accordance with a swiveling operation of swivel base 7, a luffing operation, and/or an extension/retraction operation of boom 9. Accordingly, individual measurement region ka also moves in accordance with the movement of sensor unit 65. Measurement region KA is a region including individual measurement region ka measured from different positions. In a case where measurement region display system 50 measures a measurable region in its entirety, measurement region KA becomes a region including work region SA that is a region in which the distal end portion of boom 9 is operable.

The guide information herein is information that assists an operator in determining whether a length of boom 9, a swivel position, a luff-up angle, feed-out amounts of main wire rope 14 and sub-wire rope 16, and/or the like are good or not when the operator transports load W by crane 1. The guide information includes a three-dimensional map of measurement region KA, camera image information, information on shapes of load W and feature E, height information on load W, height information on feature E, information on a traffic line of load W. and the like.

As illustrated in FIG. 2, data input section 90 is apart for inputting a setting value or the like to data processing section 70, and is formed of input apparatuses such as a touch screen, a mouse, and a keyboard apparatus.

As illustrated in FIG. 1, data display section 80 and data input section 90 are disposed inside cabin 17, at positions in front of a driver's seat which are easily visible to an operator. Data processing section 70 is preferably disposed near sensor unit 65. Note that, in a case where data processing section 70, data display section 80, and data input section 90 are integrally configured by a tablet PC, measurement region display system 50 may also be configured such that data processing section 70 is disposed inside cabin 17.

A wired LAN is preferably used for data transmission between data acquisition section 60 and data processing section 70. Note that, a wireless LAN or power line communication may be used for data transmission between data acquisition section 60 and data processing section 70.

Hereinafter, a state of acquisition of data by data acquisition section 60 will be described.

Data acquisition section 60 continuously takes images of individual measurement region ka by camera 61 to acquires camera images of individual measurement region ka.

Figure 5:
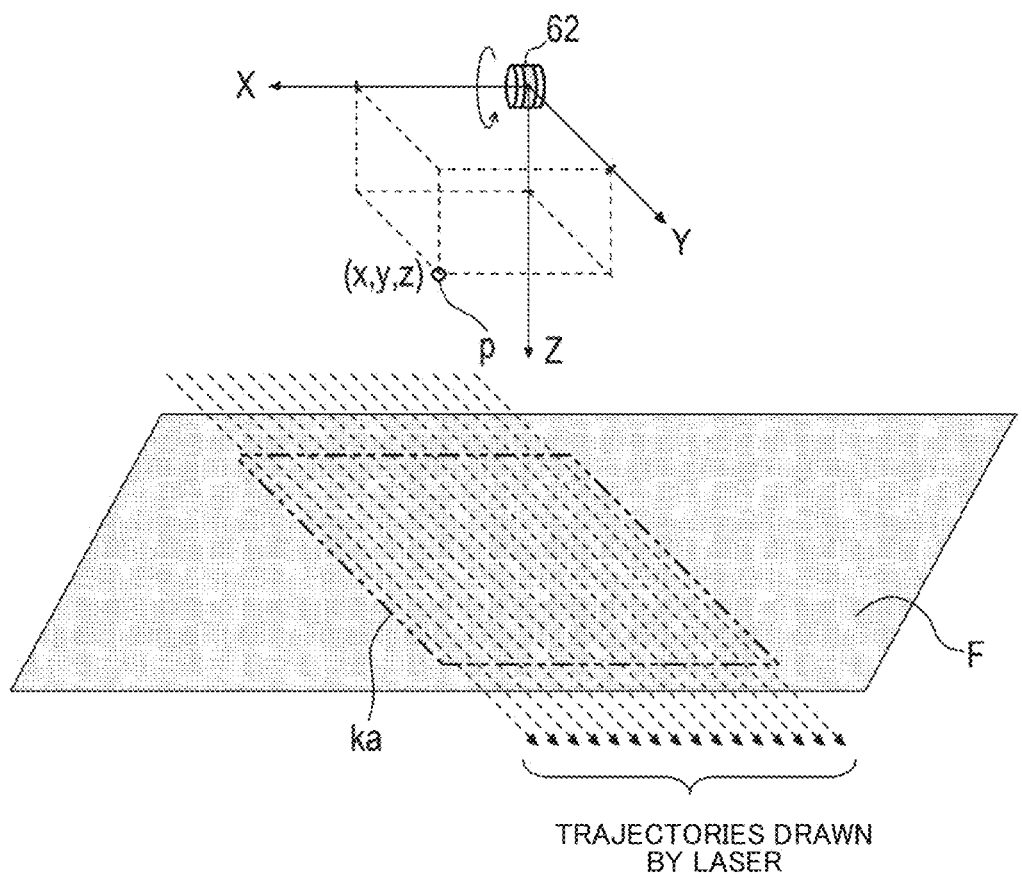
FIG. 5 is a schematic diagram illustrating a relationship between the individual measurement region and trajectories drawn by laser.

As illustrated in FIG. 5, data acquisition section 60 continuously scans individual measurement region ka by laser scanner 62 to acquire point cloud data of a measurement target object on individual measurement region ka. Hereinafter, the point cloud data acquired by laser scanner 62 will be referred to as point cloud data P. Point cloud data P is a set of point data p, and point data p indicates each point located on ground surface F, load W, and feature E that are present on individual measurement region ka.

Data acquisition section 60 acquires point cloud data P by laser scanner 62 and receives time information from a plurality of positioning satellites by third GNSS receiver 64$c$ at the same time. Further, data processing section 70 gives information on acquisition time tp of point data p to point data p.

Further, data acquisition section 60 acquires point cloud data P by laser scanner 62, acquires attitude data Q of laser scanner 62 at predetermined intervals by IMU 63, and acquires position data R and azimuth data D of laser scanner 62 by first GNSS receiver 64$a$ and second GNSS receiver 64$b$ at the same time. Note that, data processing section 70 may calculate the position and orientation of laser scanner 62 based on the position of the swivel center of swivel base 7, which is acquired by second GNSS receiver 64$b$, and a swivel position of swivel base 7, a boom length, and a luff-up angle, which are output from control apparatus 18.

Attitude data Q includes information on an angle and acceleration of laser scanner 62 with respect to each axis direction of X-, Y-, Z-axes. Note that, an acquisition cycle of attitude data Q by IMU 63 is set to be shorter than an acquisition cycle of point cloud data P by laser scanner 62. Attitude data Q is a set of individual attitude data q that is measured in each measurement cycle.

Data acquisition section 60 acquires attitude data Q by IMU 63 and receives time information from a plurality of positioning satellites by fourth GNSS receiver 64$d$ at the same time. Data processing section 70 gives acquisition time tq as information on an acquisition time of individual attitude data q, to individual attitude data q.

Position data R includes information on the position of laser scanner 62 in the XYZ coordinate system. Note that, an acquisition cycle of position data R by first GNSS receiver 64$a$ and second GNSS receiver 64$b$ is set to be shorter than an acquisition cycle of point cloud data P by laser scanner 62. Position data R is a set of individual position data r that is measured in each measurement cycle. Data processing section 70 calculates individual azimuth data d based on individual position data r. Azimuth data D is a set of individual azimuth data d that is measured in each measurement cycle.

First GNSS receiver 64$a$ and second GNSS receiver 64$b$ acquire position data Rand azimuth data D and receive time information from a plurality of positioning satellites at the same time. Data processing section 70 gives acquisition time tr as information on acquisition time of position data R and azimuth data D, to position data R and azimuth data D.

Next, a state of processing of data by data processing section 70 will be described.

The ground surface estimation method according to the embodiment of the present invention includes a point cloud data acquisition process, a grid generation processing process, a continuous region recognition process, and a ground surface estimation process.

(Point Cloud Data Acquisition Process)

Data processing section 70 acquires measurement data. Specifically, data processing section 70 cuts out point cloud data P for one frame from stream data of point cloud data P and outputs point cloud data P for one frame described above. Point cloud data P for one frame is a set of point data p acquired while the radiation direction of laser by laser scanner 62 makes one round around the X-axis. Further, data processing section 70 acquires a camera image of camera 61, attitude data Q of IMU 63, and position data R and azimuth data D acquired by first GNSS receiver 64$a$ and second GNSS receiver 64$b$ as measurement data.

Figure 13:
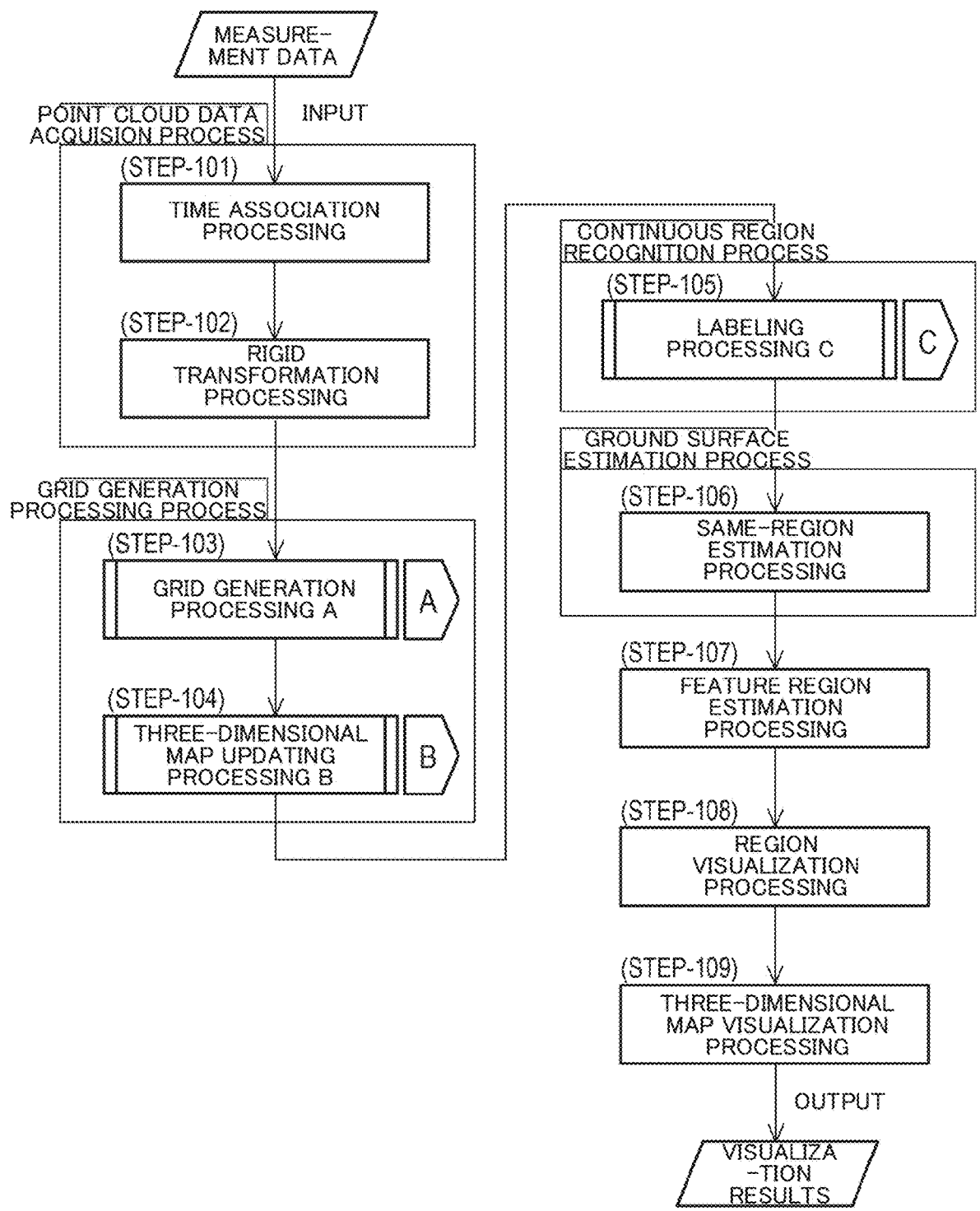
FIG. 13 is a flow diagram illustrating a flow of data processing by a data processing section.

Data processing section 70 associates point data p included in point cloud data P for one frame with attitude data Q acquired by IMU 63, and position data R and azimuth data D acquired by first GNSS receiver 64a and second GNSS receiver 64b according to the time (see time association processing (STEP-101) in FIG. 13).

Specifically, with respect to attitude data Q, data processing section 70 retrieves acquisition time tq of individual attitude data q closest to acquisition time tp of each point data p, and associates individual attitude data q at acquisition time tq with each point data p. Further, with respect to position data R and azimuth data D, data processing section 70 retrieves acquisition time tr of position data R and azimuth data D closest to acquisition time tp of each point data p, and associates individual position data r and individual azimuth data d at acquisition time tr with each point data p.

In this way, data processing section 70 outputs point data p associated with individual attitude data q, individual position data r, and individual azimuth data d according to the time.

Data processing section 70 performs rigid transformation processing to a combination of point data p, individual attitude data q, individual position data r, and individual azimuth data d that are associated with each other according to the time (see rigid transformation processing (STEP-102) in FIG. 13). Specifically, data processing section 70 performs an affine transformation of point cloud data P based on individual attitude data q, individual position data r, and individual azimuth data d to transform point cloud data P into that in a surface rectangular coordinate system. Thus, point cloud data P whose inclination, position, orientation have been corrected is output. An altitude value of point data p becomes a value of point data p, whose inclination, position, and orientation have been corrected, in the Z coordinate. That is, an altitude value of a radiation point of laser scanner 62 is calculated as a value of point data p in the Z coordinate. However, since the Z-axis is the axis in the vertically downward direction, the position of the altitude becomes lower as the value of the Z coordinate becomes larger.

(Grid Generation Processing Process)

Figure 6A:
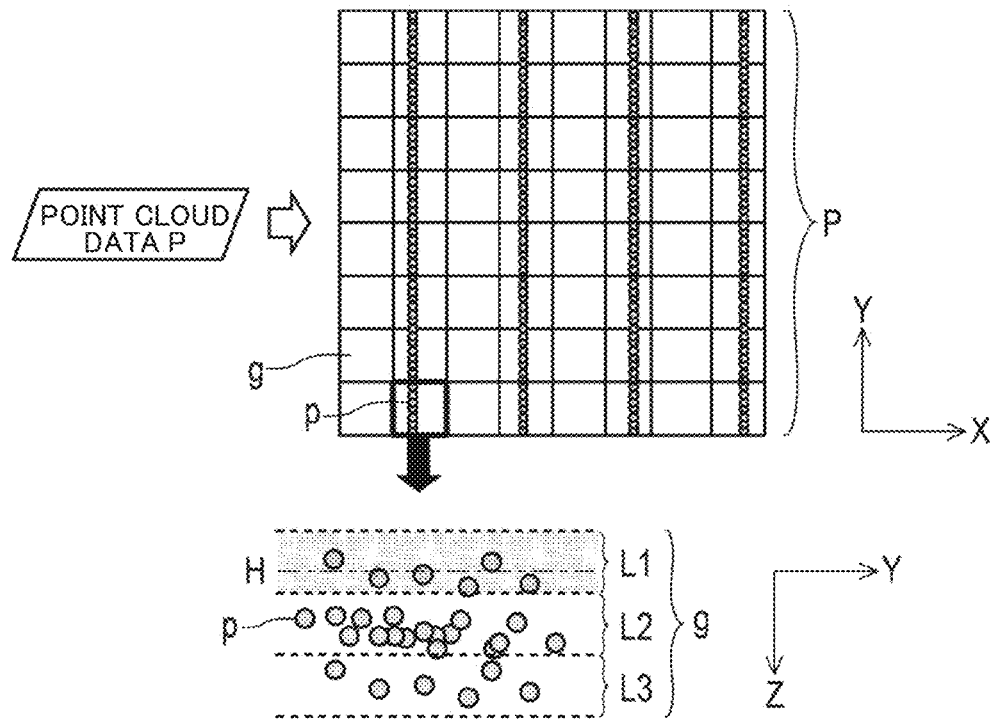
FIGS. 6A and 6B are diagrams for describing grid generation processing, where
Figure 6B:
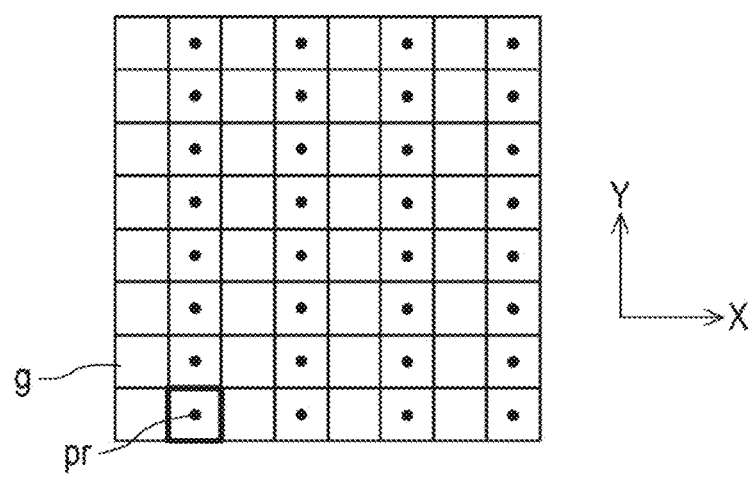

As illustrated in FIGS. 6A and 6B, data processing section 70 divides point cloud data P, which has been corrected, in its entirety by grids g having a certain size, and sets representative points pr of grids g (grid generation processing A (STEP-103) in FIG. 13). Specifically, data processing section 70 first superimposes point cloud data P that has been corrected. As illustrated in FIG. 6A, data processing section 70 then divides point cloud data P, which has been superimposed, in its entirety by grids g having a certain size.

Point cloud data P that has been superimposed may include not only point data p acquired by radiating laser on an upper surface of feature E or ground surface F, but also point data p acquired by radiating laser on aside surface of feature E or ground surface F. In order to generate the guide information with an upper surface of feature E or ground surface F as a target, data processing section 70 first slices each grid g in the horizontal direction at arbitrary intervals. Data processing section 70 then calculates, for each grid g, average altitude value H that is an average value of altitude values of point data p (point cloud data P) of layer L1, in which point data p is present and which is located at the highest altitude, among layers L1, L2, L3 . . . formed by slicing. Further, data processing section 70 calculates a center-of-gravity position of each grid g. As illustrated in FIG. 6B, data processing section 70 finally sets the center-of-gravity position of each grid g at average altitude value H, which has been calculated, as a position of representative point pr of each grid g. Thus, even in a case where ground surface F has unevenness and laser is radiated on a side surface of the unevenness of ground surface F, data processing section 70 can set representative point pr of point cloud data P which is estimated to have been acquired by radiating laser on an upper surface of the unevenness of ground surface F.

Note that, a layer for which average altitude value H is calculated is not limited to layer L1, but may be a layer selected based on the number of point data p, the positions of point data p, and the density of point data p in each layer. For example, a layer having the largest number of point data p among layers may be selected. Alternatively, the highest layer among layers in which an arbitrary number or more of point data p is present may be selected. Alternatively, a layer in which point data p is uniformly present along a Z direction may be selected since it is highly likely that point data p of the layer in which point data p is uniformly present along the Z direction is acquired by radiating laser on an upper surface of feature E.

Figure 7A:
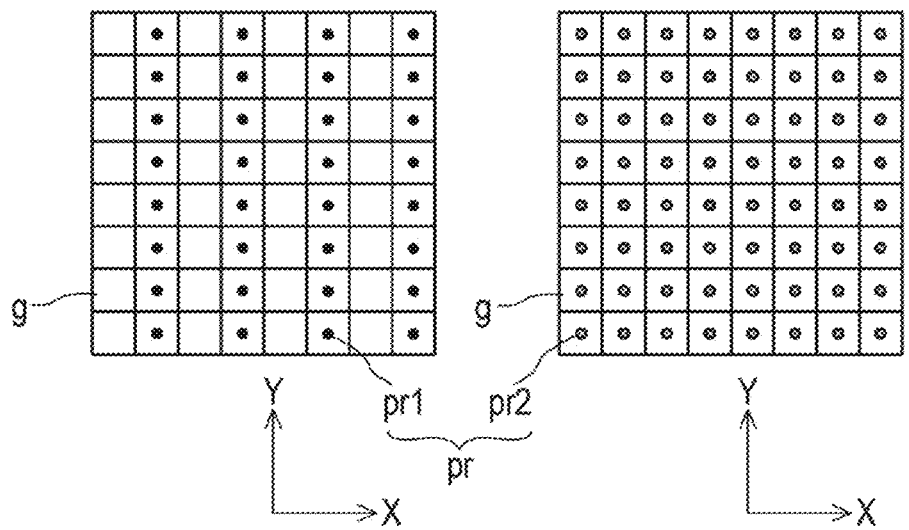
FIGS. 7A and 7B are diagrams for describing three-dimensional map updating processing, where
Figure 7B:
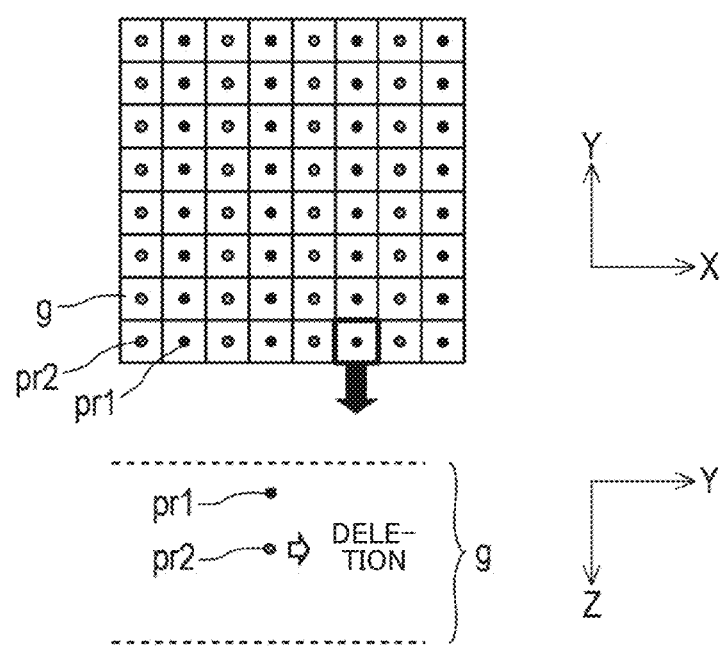
Figure 8:
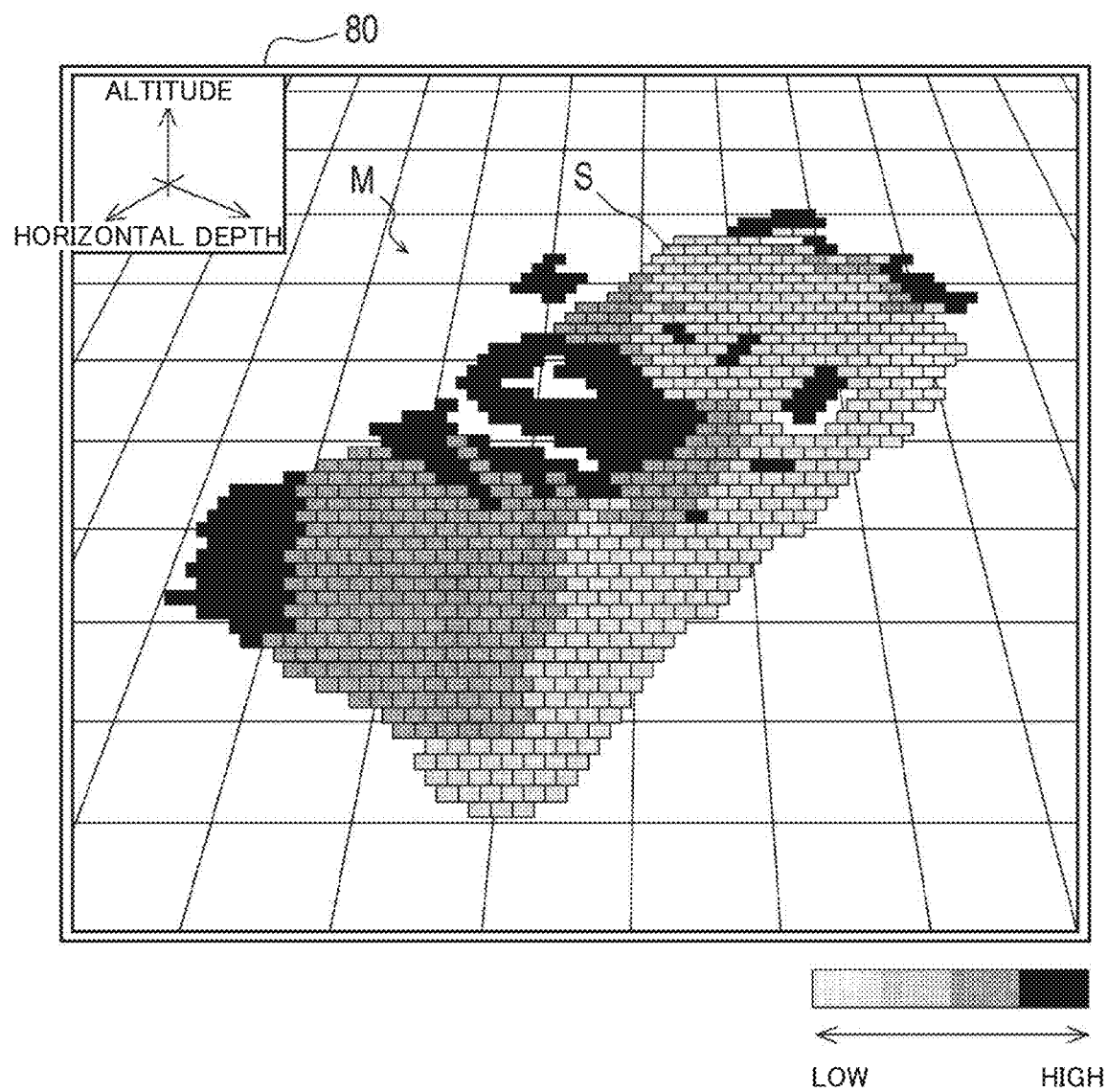
FIG. 8 is a diagram illustrating a display state of a three-dimensional map in which altitude values of grids are indicated by shading.

As illustrated in FIGS. 7A and 7B, data processing section 70 updates a three-dimensional map in its entirety generated prior to a current time by using representative point pr set for each grid g (three-dimensional map updating processing B (STEP-104) in FIG. 13). The left diagram of FIG. 7A illustrates only representative point pr1 in each grid g, where representative point pr1 is representative point pr set for each grid g. The right diagram of FIG. 7A illustrates only representative point pr2 in each grid g, where representative point pr2 is representative point pr for each grid g on the three-dimensional map generated prior to the current time. Specifically, data processing section 70 first acquires representative point pr1 and representative point pr2 for each grid g. As illustrated in FIG. 7B, in a case where a plurality of representative points pr is present in one grid g, data processing section 70 deletes representative point pr2. Data processing section 70 generates a surface having the size of grid g for each of every representative point pr after deletion, and outputs a three-dimensional map of measurement region KA between an altitude value of representative point pr of interest grid ga and an altitude value of representative point pr of each grid g present in the four neighborhoods. As illustrated in FIG. 8, in a case where three-dimensional map M is displayed on data display section 80, the color of surface S is displayed more densely as the altitude value of representative point pr of grid g becomes higher.

(Continuous Region Recognition Process)

As illustrated in FIGS. 9A to 9E, data processing section 70 gives a label to each continuous region by using a three-dimensional map (see labeling processing C (STEP-105) in FIG. 13). The continuous region is a region in which a difference in altitude value between representative points of grids g adjacent to each other is equal to or less than a threshold. The threshold is set based on measurement errors of laser scanner 62 in the Z-axis direction, and is set to 0.1 m, for example. Labels are sequentially given with numbers from No. 1 on. Hereinafter, for the sake of description, the altitude value of representative point pr present at a position with the lowest altitude is set as a reference, and the height from representative point pr set as a reference is the altitude value of representative point pr of grid g.

Figures 9A, 9B, 9C, 9D, 9E:
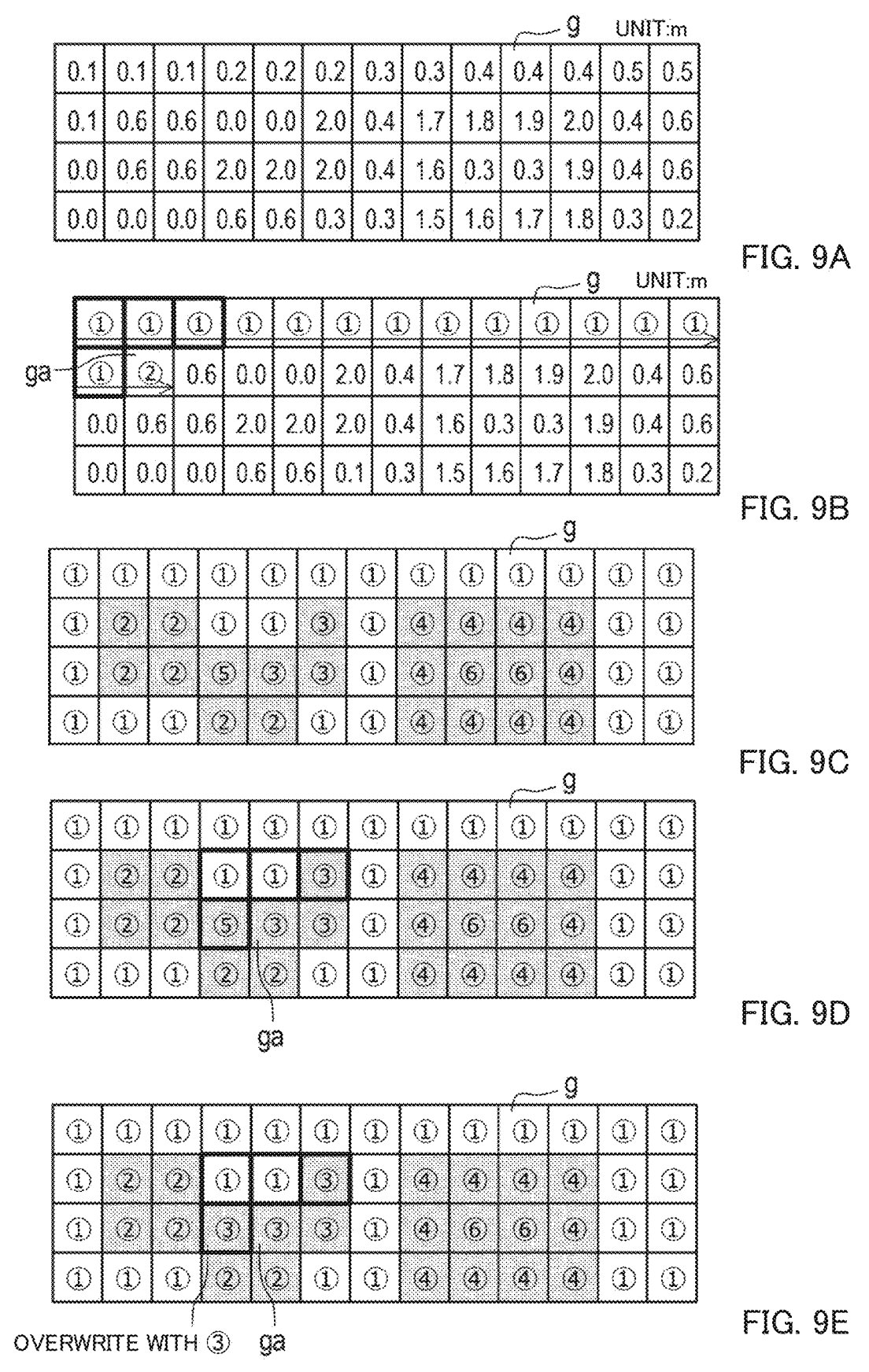

As illustrated in FIGS. 9A and 9B, specifically, data processing section 70 first selects interest grid ga from grids g of a three-dimensional map. An altitude value of representative point pr of interest grid ga is compared with altitude values of representative points pr of grids g present in four neighborhoods at the upper-left, upper, upper-right, and left thereof (hereinafter, simply referred to as "four neighborhoods"). The order of selection of interest grid ga is from the left end to the right starting from the upper left of the three-dimensional map, and, when the right end is reached, from the left end of one grid below to the right.

In a case where any of differences between an altitude value of representative point pr of interest grid ga and an altitude value of representative point pr of each grid g present in the four neighborhoods thereof is equal to or less than the threshold, data processing section 70 gives the same label as that of grid g having a difference in altitude value being equal to or less than the threshold, to interest grid ga. In a case where every difference between an altitude value of representative point pr of interest grid ga and an altitude value of representative point pr of each grid g present in the four neighborhoods thereof is larger than the threshold, data processing section 70 gives anew label to interest grid ga. The new label is a label whose number is obtained by increasing the largest number among those of labels given up to this point in time by one. In a case where there are a plurality of label types of grids g having a difference between an altitude value of representative point pr of interest grid ga and an altitude value of representative point pr of each grid g present in the four neighborhoods thereof being equal to or less than the threshold, however, data processing section 70 gives a label having the smallest number among labels of grids g having a difference in altitude value being equal to or less than the threshold, to interest grid ga. By performing these pieces of processing to every grid g, it is possible to compare interest grid ga with grids g present in eight neighborhoods at the upper-left, upper, upper-right, left, right, lower-left, lower, and lower-right thereof.

For example, in a case where interest grid ga indicated in FIG. 9B is selected, data processing section 70 calculates every difference between the altitude value of representative point pr of interest grid ga and an altitude value of representative point pr of each grid g present in the four neighborhoods thereof as 0.5 m. Since every difference between the altitude value of representative point pr of interest grid ga and the altitude value of representative point pr of each grid g present in the four neighborhoods thereof is larger than the threshold of 0.1 m, data processing section 70 gives label No. 2 obtained by increasing the number of label No. 1 by one to interest grid ga.

As illustrated in FIGS. 9C, 9D, and 9E, data processing section 70 selects interest grid ga again from grids g after labels are given to every grid g. The order of selection of interest grid ga is from the left end to the right starting from the upper left of a three-dimensional map, and, when the right end is reached, from the left end of one grid below to the right in the same manner as in giving labels.

Data processing section 70 compares an altitude value of representative point pr of interest grid ga with an altitude value of representative point pr of each grid g present in the four neighborhoods thereof. In a case where grid g in the four neighborhoods of interest grid ga has a difference in altitude value being equal to or less than the threshold and is given a label different from the label of interest grid ga, data processing section 70 overwrites the label of grid g, which has a difference in altitude value being equal to or less than the threshold and which is given the label different from the label of interest grid ga, with the label of interest grid ga.

For example, in a case where interest grid ga indicated in FIG. 9D is selected, data processing section 70 calculates each difference between the altitude value of representative point pr of interest grid ga and the altitude value of representative point pr of each grid g present at the left and upper-right thereof as 0 m, and calculates each difference between the altitude value of representative point pr of interest grid ga and the altitude value of representative point pr of each grid g present at the upper-left and upper thereof as 2 m. Further, grid g present at the left of interest grid ga is given label No. 5 which is different from label No. 3 given to interest grid ga. Accordingly, grid g at the left of interest grid ga has a difference in altitude value being equal to or less than the threshold of 0.1 m, and is given a label different from the label of interest grid ga. For this reason, as illustrated in FIG. 9E, data processing section 70 overwrites the label of grid g at the left of interest grid ga with label No. 3.

Finally, data processing section 70 outputs a three-dimensional map in which labels are given to grids g. Thus, data processing section 70 compares altitude values of representative points pr between grids g adjacent to each other, and recognizes grids g, to which the same label is given, as a continuous region regardless of the presence or absence of inclination.

(Ground Surface Estimation Process)

Data processing section 70 estimates labels indicating regions of ground surface F and load W, and regions other than those of ground surface F and load W from a three-dimensional map in which labels are given (same-region estimation processing (STEP-106) in FIG. 13). Specifically, since a region of ground surface F is considered to be the widest, data processing section 70 sets the same label having the largest number of grids g as a label given to grids g of ground surface F. That is, data processing section 70 estimates a continuous region having the largest number of grids g among continuous regions as ground surface F. Data processing section 70 is capable of automatically performing such estimation of ground surface F in real time. For example, as illustrated in FIG. 9E, the number of grids g of label No. 1 is the largest so that data processing section 70 estimates a continuous region of label No. 1 as ground surface F (see the white portion). In a case where three-dimensional map M is displayed on data display section 80, data processing section 70 displays a region of ground surface F by distinguishing the region from other regions in terms of the color and shading (see FIG. 12).

Since measurement region display system 50 that performs such a ground surface estimation method recognizes a region, in which a difference in altitude value between grids g adjacent to each other is within the threshold, as a continuous region, even a region in which the altitude value continuously changes, such as an inclined surface, and even a region having unevenness with a height within the threshold are recognized as continuous regions. Thus, even ground surface F in which the height varies due to inclination and/or unevenness can be recognized as ground surface F that is continuous.

In the present embodiment, a configuration has been described in which measurement region display system 50 is independent from crane 1. However, it may also be configured such that crane 1 includes: a variety of sensors 61 to 64d, which have been described as being included in data acquisition section 60; the display apparatus, which has been described as being included in data display section 80; and the input apparatus, which has been described as being included in data input section 90, and that control apparatus 18 performs data processing, which has been described as being performed by data processing section 70.

In crane 1 as such, point cloud data P in work region SA of crane 1 is acquired in accordance with operations of swivel base 7 and/or boom 9, and a region in which a difference in altitude value is within the threshold is recognized as a continuous region so that even when there are a wide region in which the altitude value continuously changes and a wide region having unevenness with a height within the threshold, the regions are recognized as continuous regions. Thus, even ground surface F in which the height varies due to inclination and/or unevenness in work region SA of crane 1 can be recognized as ground surface F that is continuous. Note that, measurement region display system 50 can also be used for work vehicles other than crane 1. For example, measurement region display system 50 can also be used for an aerial work platform or the like.

Data processing section 70 acquires a label of grid g of representative point pr having the lowest altitude value among representative points pr of grids g present in a manually input range of load W (see FIG. 1 IB), and sets the label as a label given to grids g of load W. This is because, in a case where grids g include grid g of load W and grid g of a hook or wire, an altitude value of representative point pr in grid g of load W is lower than an altitude value of representative point pr in grid g of the hook or wire rope. Note that, a height of load W (length in the Z-axis direction) is actually measured and is input to data processing section 70 since it is impossible to measure a side surface and a lower portion of load W from the distal end portion of boom 9.

Figure 10A:
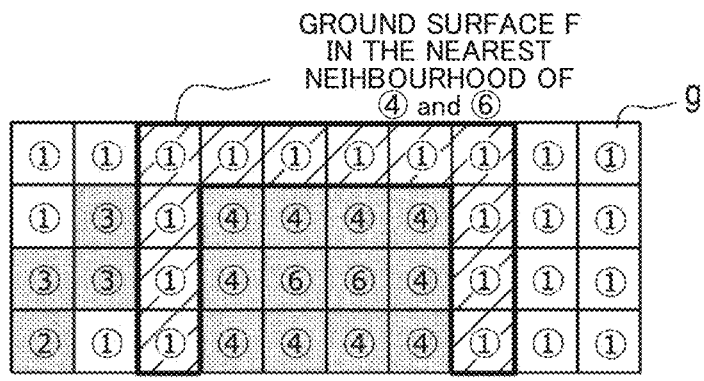
FIGS. 10A to 10C are diagrams for describing feature region estimation processing, where
Figure 10B:
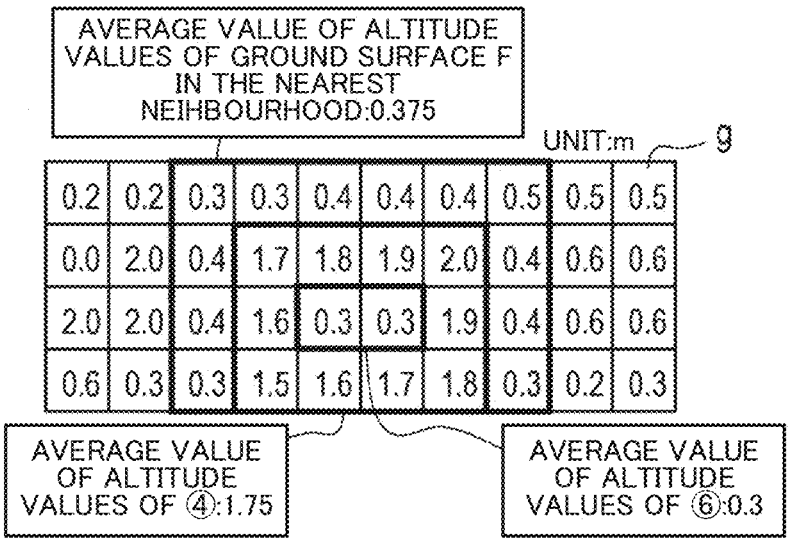
Figure 10C:
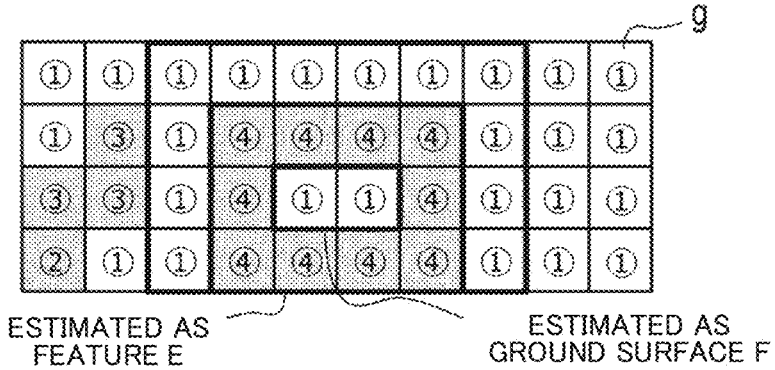

As illustrated in FIGS. 10A to 10C, data processing section 70 estimates a region for each feature E by using labels given to grids g (feature region estimation processing of FIG. 13 (STEP-107)). Specifically, data processing section 70 performs this processing for each continuous region other than those of ground surface F and load W estimated in the same-region estimation processing. First, data processing section 70 calculates an average value of altitude values of representative points pr in a continuous region and a region of ground surface F present in the nearest neighborhood thereof. The "region of ground surface F present in the nearest neighborhood" herein is a region formed of grids g adjacent to a continuous region in a case where the continuous region and a region of ground surface F are adjacent to each other, and is a region formed of grids g adjacent to another continuous region between a continuous region and a region of ground surface F in a case where the continuous region and the region of ground surface F are not adjacent to each other. When a "region of ground surface F present in the nearest neighborhood" is formed including grids g not adjacent to a continuous region or grids g not adjacent to another continuous region between a continuous region and a region of ground surface F, an influence of a change in altitude value due to an inclination increases so that the "region of ground surface F present in the nearest neighborhood" is defined as the regions described above. However, the "region of ground surface F present in the nearest neighborhood" is not limited to the regions described above, but can be set as a region with an arbitrary range. Further, in a case where a difference in an average value of altitude values is equal to or less than the threshold, data processing section 70 estimates a continuous region as ground surface F. In a case where a difference in an average value of altitude values is larger than the threshold, data processing section 70 estimates a continuous region as feature E.

As illustrated in FIGS. 10A and 10B, for example, it is assumed that in the same-region estimation processing, the continuous region of label No. 1 is estimated as ground surface F and the continuous regions of labels No. 4 and No. 6 are not estimated as ground surface F or load W. The continuous region of label No. 6 is separated from the region estimated as ground surface F (the continuous region of label No. 1) by the continuous region of label No. 4. The region of ground surface F present in the nearest neighborhood of labels No. 4 and No. 6 is indicated as an oblique line portion in FIG. 10A. Data processing section 70 calculates an average value of altitude values of representative points pr in the continuous region of label No. 4 as 1.75 m. Data processing section 70 calculates an average value of altitude values of representative points pr in the continuous region of label No. 6 as 0.3 m. Data processing section 70 calculates an average value of altitude values of representative points pr in the region of ground surface F present in the nearest neighborhood of the continuous region of label No. 4 and the continuous region of label No. 6 as 0.375 m. As illustrated in FIG. 10C, since the difference in the average value of the altitude values between the continuous region of label No. 4 and the region of ground surface F present in the nearest neighborhood thereof is larger than the threshold of 0.1 m, data processing section 70 estimates the continuous region of label No. 4 as feature E. Since the difference in the average value of the altitude values between the continuous region of label No. 6 and the region of ground surface F present in the nearest neighborhood thereof is equal to or less than the threshold of 0.1 m, data processing section 70 estimates the continuous region of label No. 6 as ground surface F.

Finally, data processing section 70 outputs a set of representative points pr of grids g for each of load W, ground surface F, and feature E based on labels given to grids g. Thus, data processing section 70 is capable of recognizing a region separated from ground surface F surrounding the region by feature E, as ground surface F.

Data processing section 70 uses a set of representative points pr of grids g to visualize, for each of load W and feature E, the size and height thereof on a camera image (region visualization processing (STEP-108) in FIG. 13). Specifically, data processing section 70 first calculates the position and orientation (azimuth) of laser scanner 62 at a current time from measurement data of first GNSS receiver 64a and second GNSS receiver 64b. Next, data processing section 70 determines the coordinate axes based on the calculated position and orientation of laser scanner 62, and displays the size and height of load W, feature E or the like on a camera image by aligning positions of representative points pr of load W, feature E or the like on the camera image.

Figure 11A:
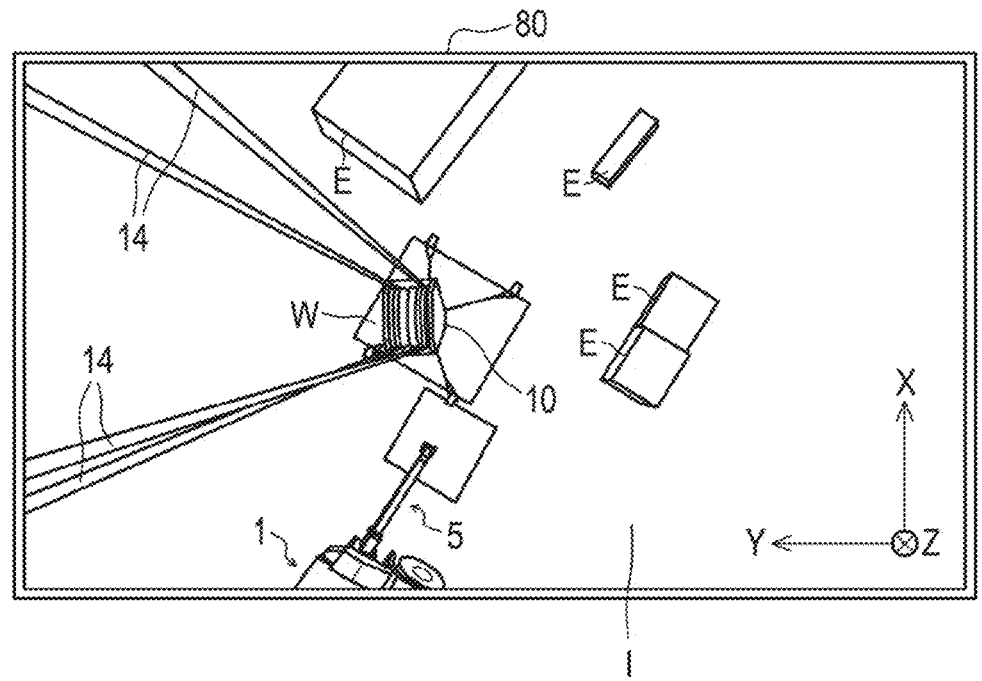
FIGS. 11A and 11B illustrate a display state of guide information, where
Figure 11B:
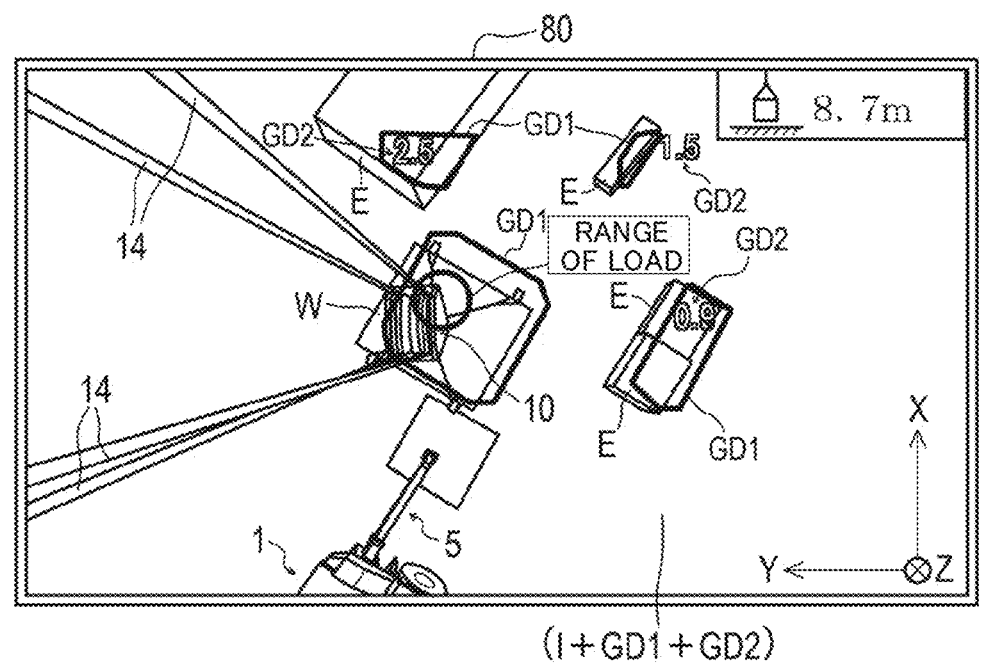

As illustrated in FIGS. 11A and 11B, data processing section 70 calculates an outer line including load W, feature E or the like on camera image I by using positions of representative points pr of load W, feature E or the like on camera image I, and displays an outline figure formed by the outer line as guide information GD1 on camera image I. Finally, data processing section 70 displays difference values between altitude values of load W or feature E and altitude values of ground surface F as guide information GD2 (height information) on guide information GD1. Note that, the drawing color of guide information GD1 is displayed in a predetermined color whose shading is changed in accordance with the height of load W or feature E. Further, with respect to significant figures of heights of load W and feature E, values are rounded to the first decimal place.

Figure 12:
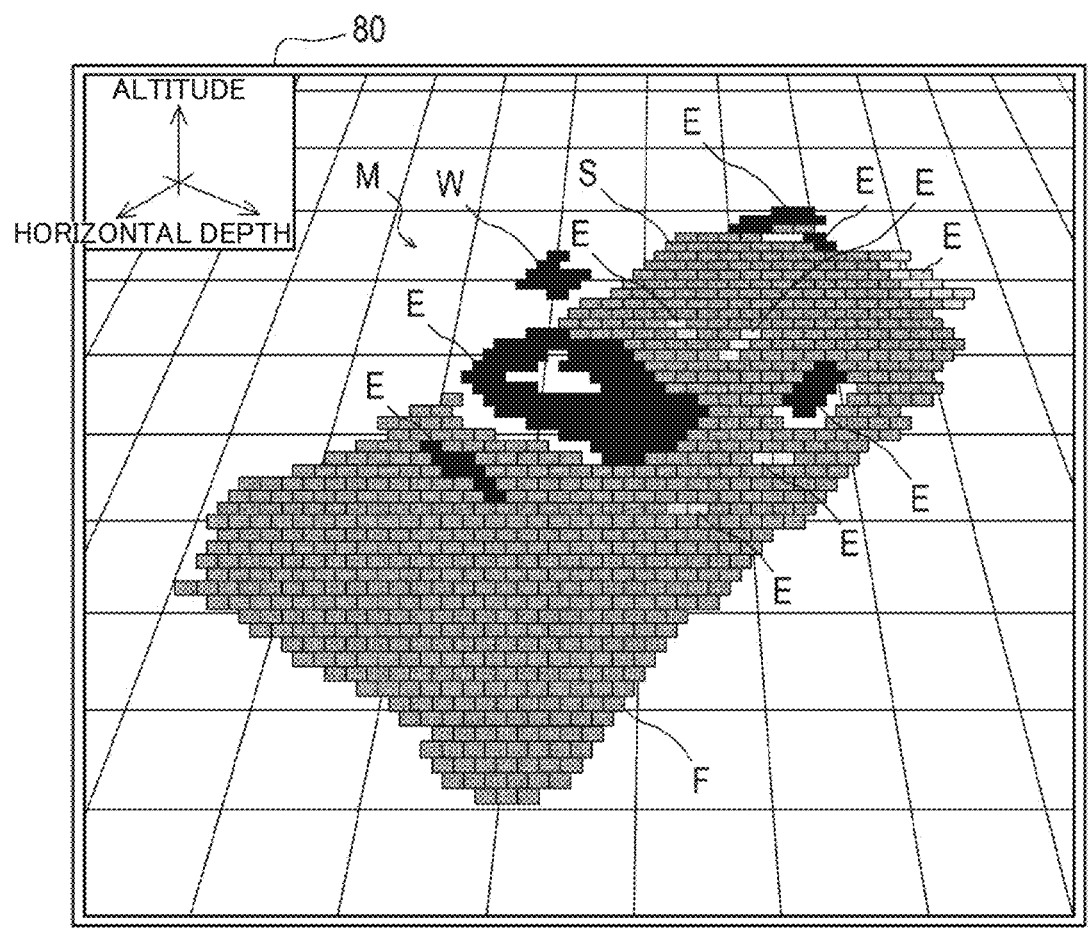
FIG. 12 illustrates a display state of a three-dimensional map in which regions are distinguished from each other and indicated for each continuous region.

As illustrated in FIG. 12, data processing section 70 uses a three-dimensional map of measurement region KA in which labels are given for each of load W, ground surface F, and feature E to visualize the positional relationship and size of each of load W, ground surface F, and feature E in a three-dimensional space (three-dimensional map visualization processing of FIG. 13 (STEP-109)). Specifically, data processing section 70 first generates surfaces S having representative point pr as the center of gravity based on the positions and altitude values of representative points pr for each of load W, ground surface F, and feature E. At this time, the width of surface S is set to be the width of grid g used when generating representative point pr. Then, data processing section 70 colors surfaces S for each of load W, ground surface F, and feature E, and visualizes three-dimensional map M therewith in the three-dimensional space on data display section 80.

Note that, the width of grid g is changed in accordance with the states of crane 1 and/or measurement region KA to adjust the visibility of three-dimensional map M. For example, when the width of grid g is reduced as the height of the distal end portion of boom 9 becomes higher, data processing section 70 can visualize a wide range of measurement region KA measured from a high position by using three-dimensional map M with surface S being smaller. In a case where a plurality of features E having a height difference being within the threshold is close to each other on measurement region KA, data processing section 70 can visualize the plurality of features E as one feature E on three-dimensional map M by increasing the width of grid g.

Hereinafter, a control aspect of measurement region display system 50 will be specifically described.

As illustrated in FIG. 13, measurement data is input to data processing section 70, and data processing section 70 proceeds to STEP-101.

In STEP-101, data processing section 70 performs time association processing, and proceeds to STEP-102.

In STEP-102, data processing section 70 performs rigid transformation processing, and proceeds to STEP-103.

Figure 14:
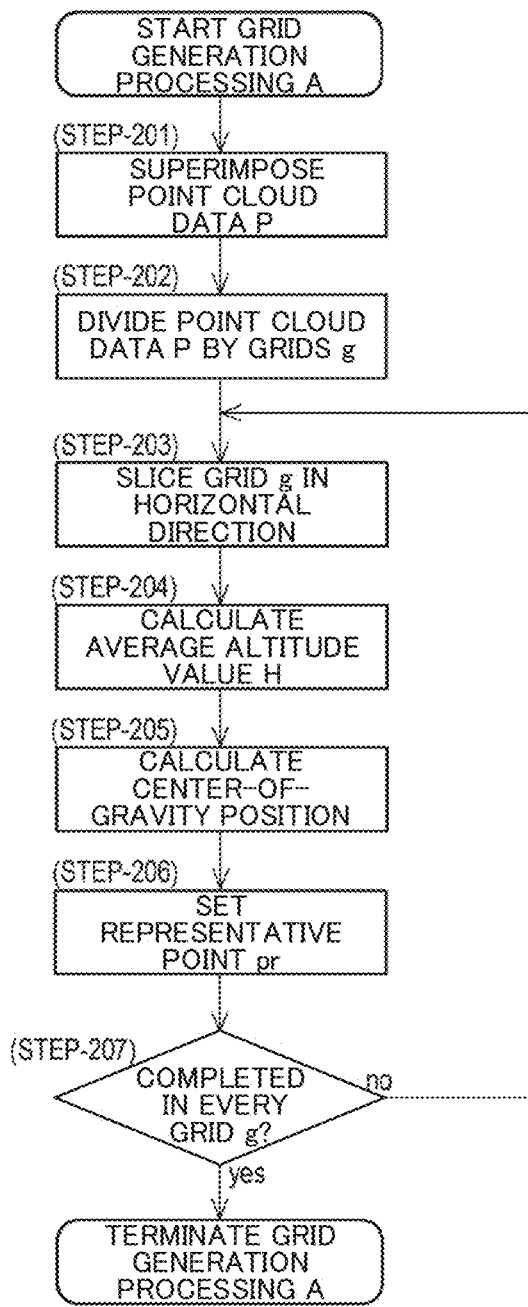
FIG. 14 is a flow diagram illustrating the grid generation processing.

In STEP-103, data processing section 70 starts grid generation processing A, and proceeds to STEP-201 (see FIG. 14). Then, when grid generation processing A is terminated, data processing section 70 proceeds to STEP-104.

Figure 15:
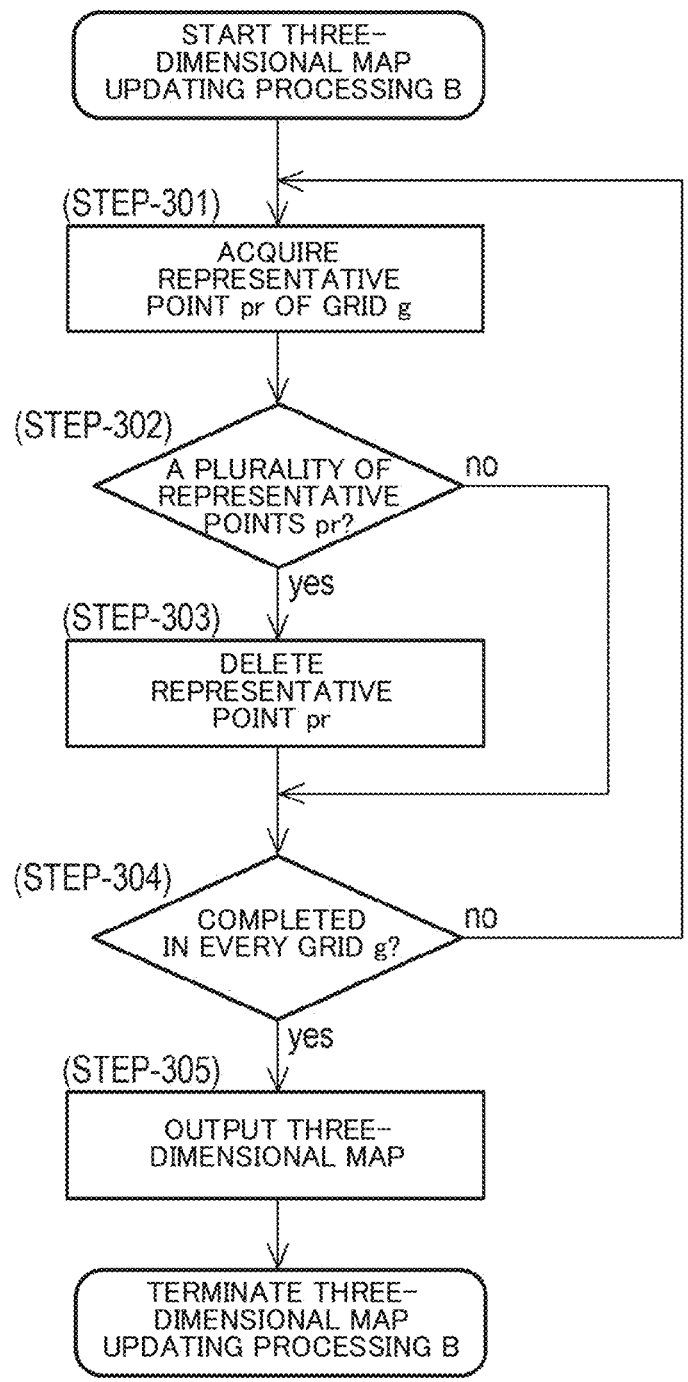
FIG. 15 is a flow diagram illustrating the three-dimensional map updating processing.

In STEP-104, data processing section 70 starts three-dimensional map updating processing B, and proceeds to STEP-301 (see FIG. 15). Then, when three-dimensional map updating processing B is terminated, data processing section 70 proceeds to STEP-105. Note that, in a case where a three-dimensional map is not generated prior to a current time, data processing section 70 newly generates a three-dimensional map.

Figure 16:
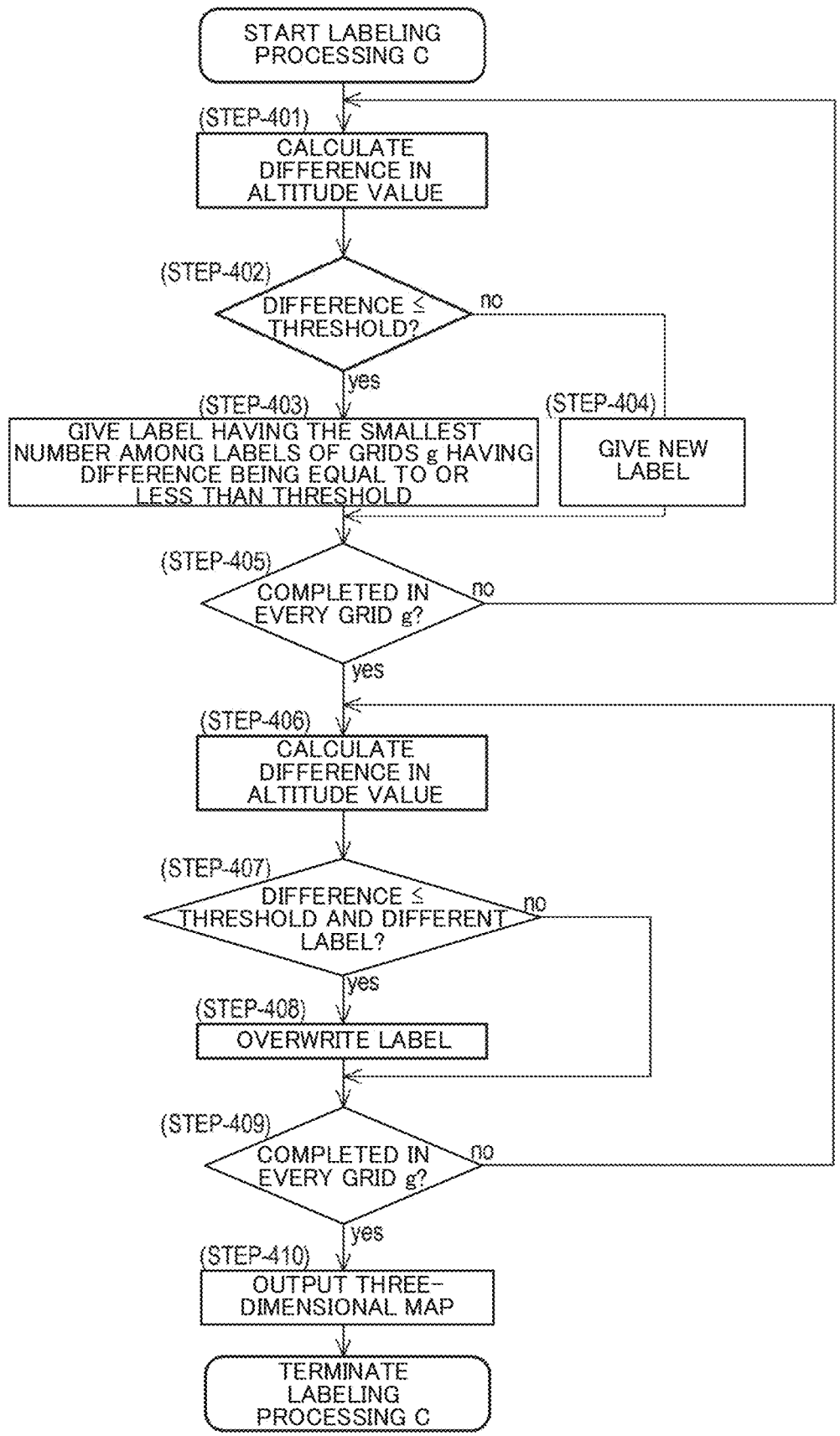
FIG. 16 is a flow diagram illustrating the labeling processing.

In STEP-105, data processing section 70 starts labeling processing C, and proceeds to STEP-401 (see FIG. 16). Then, when labeling processing C is terminated, data processing section 70 proceeds to STEP-106.

In STEP-106, data processing section 70 performs same-region estimation processing, and proceeds to STEP-107.

In STEP-107, data processing section 70 performs feature region estimation processing, and proceeds to STEP-108.

In STEP-108, data processing section 70 performs region visualization processing, and proceeds to STEP-109.

In STEP-109, data processing section 70 performs three-dimensional map visualization processing, and outputs visualization results. The visualization results are three-dimensional map M, camera image information, and the like.

As illustrated in FIG. 14, in STEP-201, data processing section 70 starts grid generation processing A, superimposes point cloud data P that has been corrected, and proceeds to STEP-202.

In STEP-202, data processing section 70 divides point cloud data P, which has been superimposed, by grids g having a certain size, and proceeds to STEP-203.

In STEP-203, data processing section 70 slices grids g, in which point cloud data P is present, in the horizontal direction at arbitrary intervals to form a plurality of layers L1, L2, L3 . . . , and proceeds to STEP-204.

In STEP-204, data processing section 70 calculates average altitude value H of point data p of layer L1, in which point data p is present and which is located at the highest altitude, among the layers, and proceeds to STEP-205.

In STEP-205, data processing section 70 calculates a center-of-gravity position of each grid g, and proceeds to STEP-206.

In STEP-206, data processing section 70 sets the center-of-gravity position of each grid g at average altitude value H, which has been calculated, as a position of representative point pr of each grid g, and proceeds to STEP-207.

In STEP-207, data processing section 70 determines whether the setting of representative point pr is completed for every grid g in which point cloud data P is present.

As a result, in a case where the setting of representative point pr is completed for every grid g in which point cloud data P is present, data processing section 70 terminates grid generation processing A, and proceeds to STEP-104.

In a case where the setting of representative point pr is not completed for every grid g in which point cloud data P is present, on the other hand, data processing section 70 proceeds to STEP-203, and performs STEP-203 to grid g in which the setting of representative point pr is not performed.

As illustrated in FIG. 15, in STEP-301, data processing section 70 starts three-dimensional map updating processing B, and acquires representative point pr set in each grid g and representative point pr for each grid g on a three-dimensional map generated prior to a current time.

In STEP-302, data processing section 70 determines whether a plurality of representative points pr is present in one grid g.

As a result, in a case where a plurality of representative points pr is present in one grid g, data processing section 70 proceeds to STEP-303.

In a case where a plurality of representative points pr is not present in one grid g, on the other hand, data processing section 70 proceeds to STEP-304.

In STEP-303, data processing section 70 deletes representative point pr for each grid on the three-dimensional map generated prior to the current time, and proceeds to STEP-304.

In STEP-304, data processing section 70 determines whether STEP-301 and STEP-302 are completed for every grid g.

As a result, in a case where STEP-301 and STEP-302 are completed for every grid g, data processing section 70 proceeds to STEP-305.

In a case where STEP-301 and STEP-302 are not completed for every grid g, on the other hand, data processing section 70 proceeds to STEP-301, and performs STEP-301 to grid g in which STEP-301 and STEP-302 are not performed.

In STEP-305, data processing section 70 generates surfaces having the same size as grid g, outputs a three-dimensional map of measurement region KA, terminates three-dimensional map updating processing B, and proceeds to STEP-105.

As illustrated in FIG. 16, in STEP-401, data processing section 70 starts labeling processing C, calculates each difference between an altitude value of representative point pr of interest grid ga and an altitude value of representative point pr of each grid g present in the four neighborhoods thereof, and proceeds to STEP-402.

In STEP-402, data processing section 70 determines whether any of the calculated differences in altitude value is equal to or less than the threshold. Note that, in a case where no grid g in the four neighborhoods is present (interest grid ga is at the upper-left of a three-dimensional map), data processing section 70 proceeds to STEP-404, and gives label No. 1 to interest grid ga.

As a result, in a case where any of the calculated differences in altitude value is equal to or less than the threshold, data processing section 70 proceeds to STEP-403.

In a case where every calculated difference in altitude value is larger than the threshold, on the other hand, data processing section 70 proceeds to STEP-404.

In STEP-403, data processing section 70 gives a label having the smallest number among labels of grids g having a difference in altitude value being equal to or less than the threshold, to interest grid ga, and proceeds to STEP-405.

In STEP-404, data processing section 70 gives a new label to interest grid ga, and proceeds to STEP-405.

In STEP-405, data processing section 70 determines whether label giving to every grid g is completed.

As a result, in a case where the label giving to every grid g is completed, data processing section 70 proceeds to STEP-406.

In a case where the label giving to every grid g is not completed, on the other hand, data processing section 70 proceeds to STEP-401, and performs STEP-401 with grid g on the right side of or in the next row of interest grid ga as the next interest grid ga.

In STEP-406, data processing section 70 calculates each difference between an altitude value of representative point pr of interest grid ga and an altitude value of representative point pr of each grid g present in the four neighborhoods thereof, and proceeds to STEP-407.

In STEP-407, data processing section 70 determines whether grid g in the four has a difference in altitude value being equal to or less than the threshold and is given a label different from the label of interest grid ga.

As a result, in a case where grid g in the four neighborhoods of interest grid ga has a difference in altitude value being equal to or less than the threshold and is given a label different from the label of interest grid ga, data processing section 70 proceeds to STEP-408.

In a case where grid g in the four neighborhoods of interest grid ga has a difference in altitude value being equal to or less than the threshold and is not given a label different from the label of interest grid ga, on the other hand, data processing section 70 proceeds to STEP-409.

In STEP-408, data processing section 70 overwrites the label of grid g, which has a difference in altitude value being equal to or lower than the threshold and which is given the label different from the label of interest grid ga, with the label of interest grid ga, and proceeds to STEP-409.

In STEP-409, data processing section 70 determines whether STEP-406 and STEP-407 are completed for every grid g.

As a result, in a case where STEP-406 and STEP-407 are completed for every grid g, data processing section 70 proceeds to STEP-410.

In a case where STEP-406 and STEP-407 are not completed for every grid g, on the other hand, data processing section 70 proceeds to STEP-406, and performs STEP-406 with grid g on the right side of or in the next row of interest grid ga as the next interest grid ga.

In STEP-410, data processing section 70 outputs a three-dimensional map in which label are given to grids g, terminates labeling processing C, and proceeds to STEP-106.

Hereinafter, a ground surface estimation method in which the threshold is changed in accordance with distance La between laser scanner 62 and each representative point pr will be described.

Figure 17A:
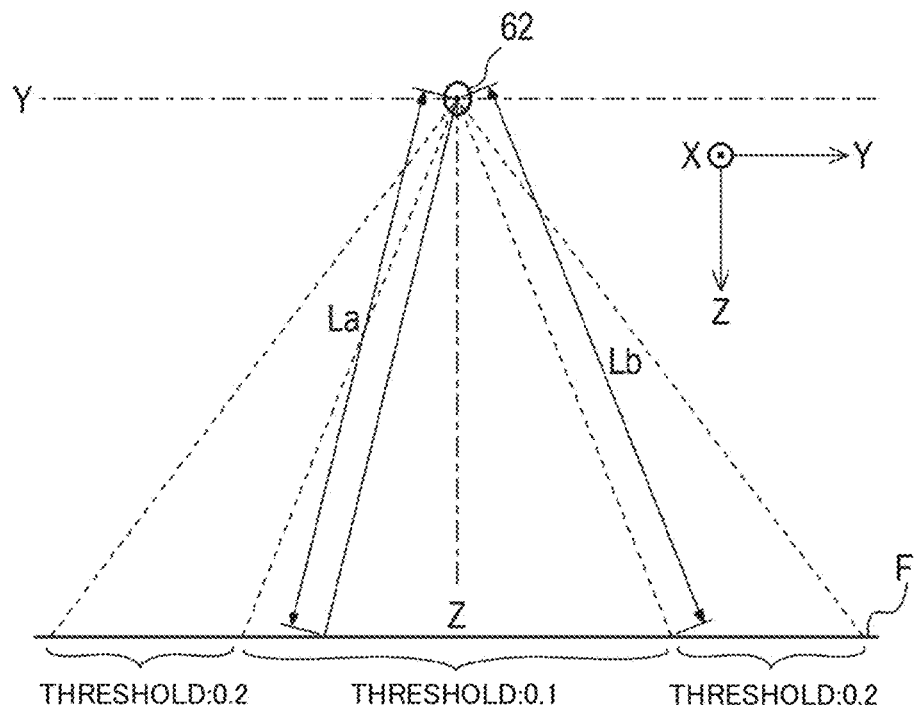
FIGS. 17A and 17B are diagrams for describing the labeling processing, where
Figure 17B:
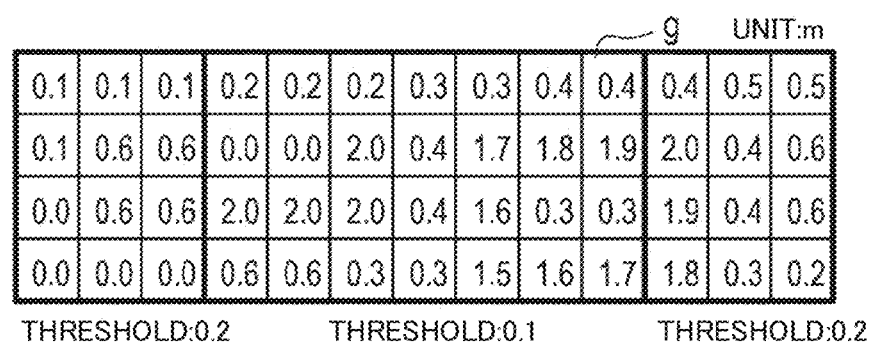

Data processing section 70 changes the threshold based on distance La between laser scanner 62 and each representative point pr and measurement performance of laser scanner 62. Distance La is calculated based on the coordinates of point cloud data P. As illustrated in FIGS. 17A and 17B, for example, in a case where distance La increases and exceeds predetermined distance Lb, data processing section 70 increases the threshold from 0.1 m to 0.2 m. Predetermined distance Lb is a distance that serves as a condition for changing the threshold. Thus, even when measurement errors of laser scanner 62 (variations in measurement results) increase by an increase in distance La, data processing section 70 can recognize grids g, in which measurement errors increase, as a continuous region within a range of an increased threshold.

Figure 18A:
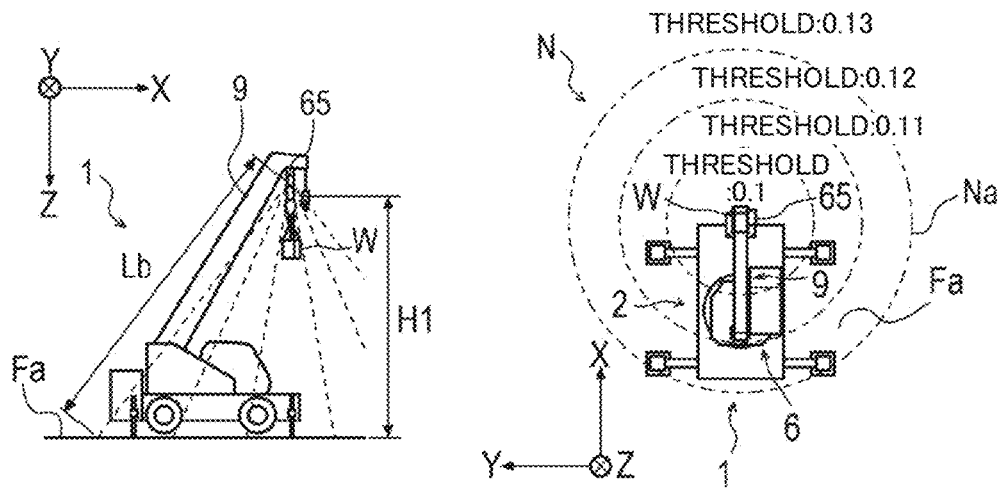
FIGS. 18A and 18B are diagrams for describing the labeling processing, where

Alternatively, as illustrated in the left diagram of FIG. 18A, data processing section 70 calculates height H1 of laser scanner 62 disposed in sensor unit 65 from the boom length, the luff-up angle, and the position where laser scanner 62 is disposed. Data processing section 70 sets virtual ground surface Fa, which is a horizontal surface, based on height H1, which has been calculated, of laser scanner 62. Specifically, data processing section 70 sets virtual ground surface Fa such that the height of laser scanner 62 from virtual ground surface Fa is equal to height H1, which has been calculated, of laser scanner 62. Then, data processing section 70 calculates a position on virtual ground surface Fa such that the distance between the position and laser scanner 62 becomes predetermined distance Lb, based on height H1 of laser scanner 62 and predetermined distance Lb.

As illustrated in the right diagram of FIG. 18A, in a case where a plurality of predetermined distances Lb is present, data processing section 70 sets concentric regions N along the Z-axis direction such that calculated positions on virtual ground surface Fa are positions of edge Na of the same circle. In concentric regions N to be set, the center of the concentric circle is at the position of laser scanner 62 disposed in sensor unit 65 in the vertically downward direction. Data processing section 70 sets a threshold for each region of virtual ground surface Fa segmented by concentric circles. For example, data processing section 70 sets thresholds of 0.1 m, 0.11 m, 0.12 m, 0.13 m for each region of virtual ground surface Fa segmented by concentric circles.

In a case where there is one predetermined distance Lb, data processing section 70 sets a circular region along the Z-axis direction such that a calculated position on virtual ground surface Fa is a position of an edge of a circle. In the circular region to be set, the center of the circle is at the position of laser scanner 62 disposed on sensor unit 65 in the vertically downward direction. Data processing section 70 sets a threshold for each region of the virtual ground surface segmented by circles.

Figure 18B:
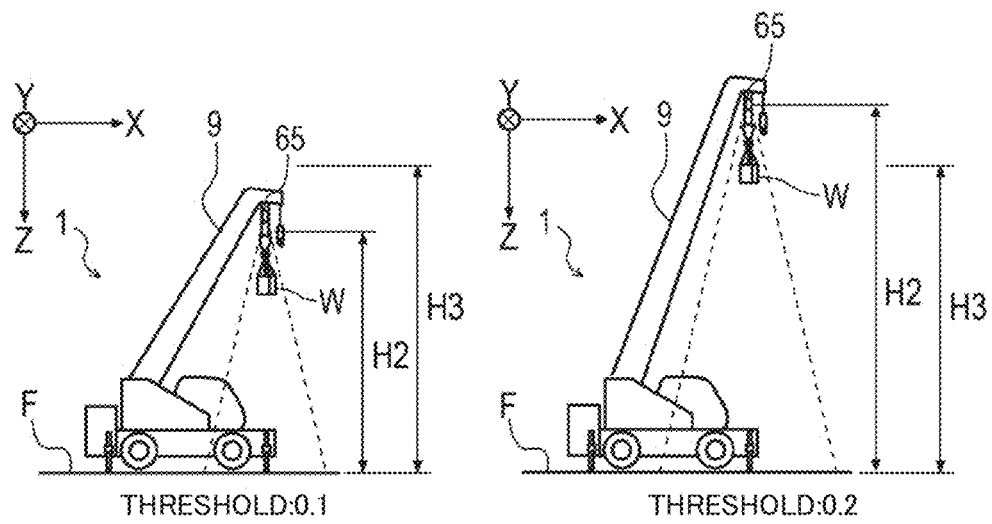

Alternatively, data processing section 70 uniformly changes the threshold of every representative point pr based on height H2 of the distal end portion of boom 9. As illustrated in FIG. 18B, for example, in a case where the height of the distal end portion of boom 9 becomes high and exceeds predetermined height H3, data processing section 70 uniformly increases the threshold of every representative point pr from 0.1 m to 0.2 m. Predetermined height H3 is a height that serves as a condition for changing the threshold. Alternatively, the threshold may also be changed in accordance with the weight of load W or the boom length since the swing of boom 9 becomes large and measurement errors increase due to the weight of load W or the boom length as well.

Hereinafter, a control aspect of measurement region display system 50 will be specifically described.

Figure 19:
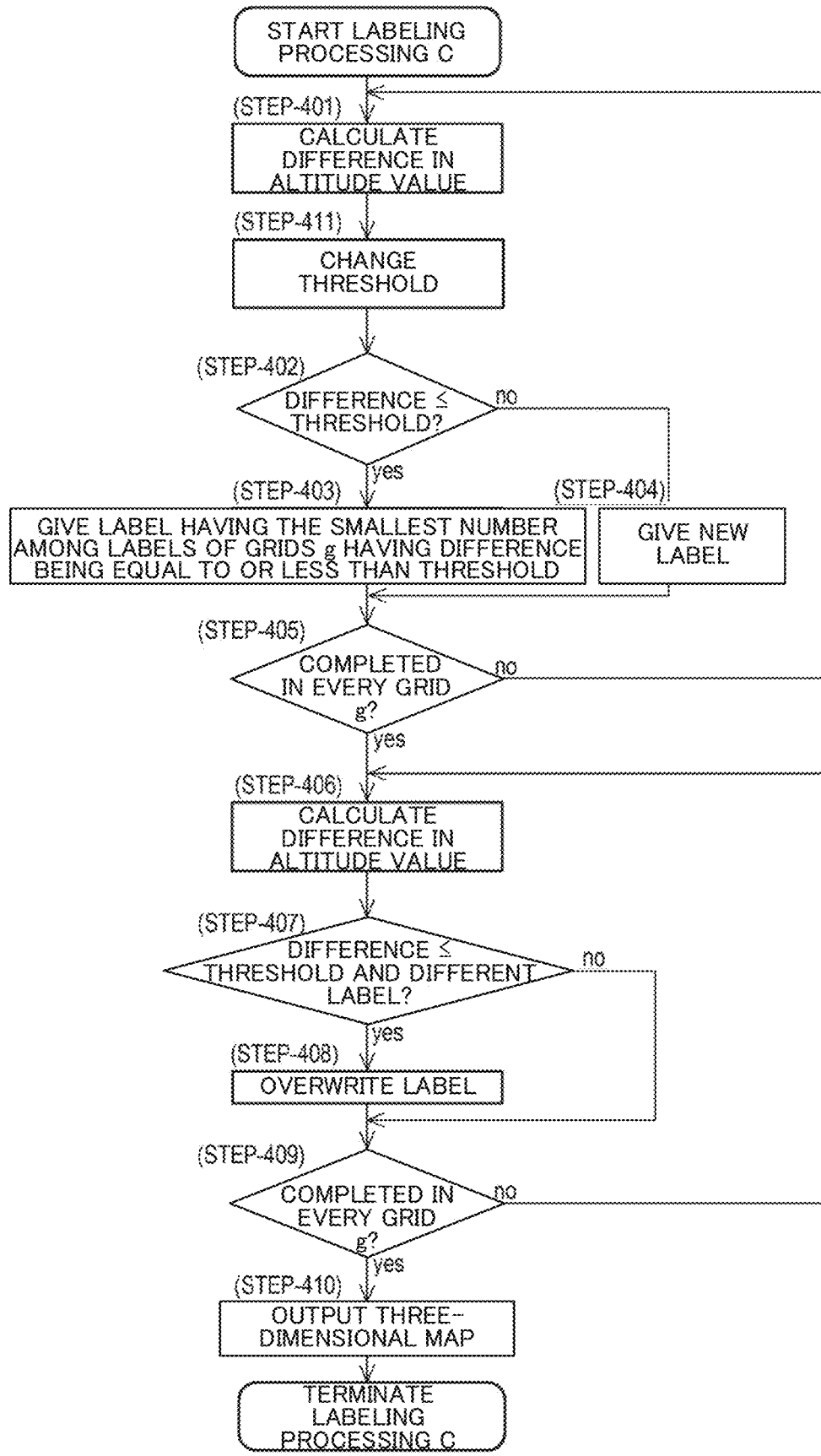
FIG. 19 is a flow diagram illustrating the labeling processing.

As illustrated in FIG. 19, in STEP-411, data processing section 70 calculates distance La between laser scanner 62 and representative point pr, changes the threshold based on distance La between laser scanner 62 and representative point pr and the measurement performance of laser scanner 62, and proceeds to STEP-402.

In such a ground surface estimation method, a continuous region for which variations in measurement results are taken into more consideration is recognized by changing the threshold to that in consideration of measurement errors in point cloud data P. Thus, ground surface F is recognized as ground surface F that is continuous even when the height of ground surface F varies due to inclination and/or unevenness.

Hereinafter, a ground surface estimation method in which the width of grid g is changed in accordance with the number of continuous regions within a predetermined range of measurement region KA will be described.

Figure 20A:
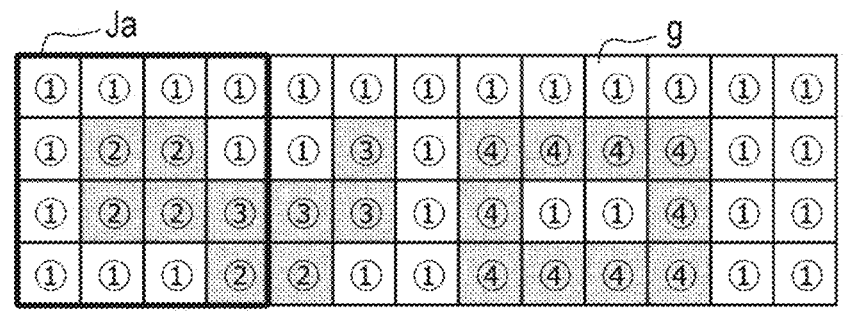
FIGS. 20A and 20B are diagrams for describing a change in a grid width in the grid generation processing, where
Figure 20A:
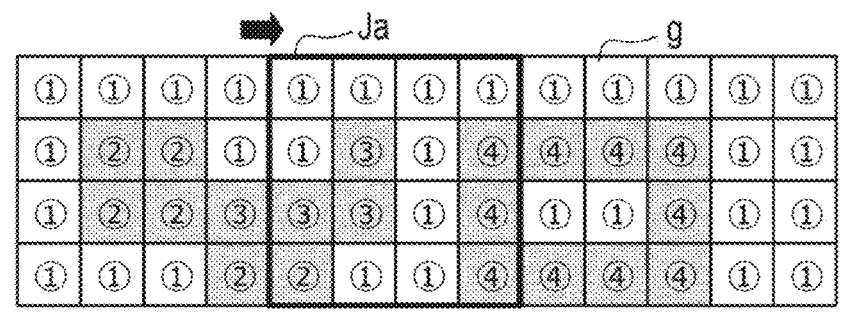

As illustrated in FIG. 20A, in a case where there are a predetermined number or more of continuous regions within a predetermined range, a region of ground surface F may become narrow and a smaller region of ground surface F may not be recognized. The predetermined range and the predetermined number are arbitrarily set. Data processing section 70 determines, while moving predetermined range Ja on grids g of a three-dimensional map in their entirety, whether there are a predetermined number or more of continuous regions within predetermined range Ja.

Figure 20B:
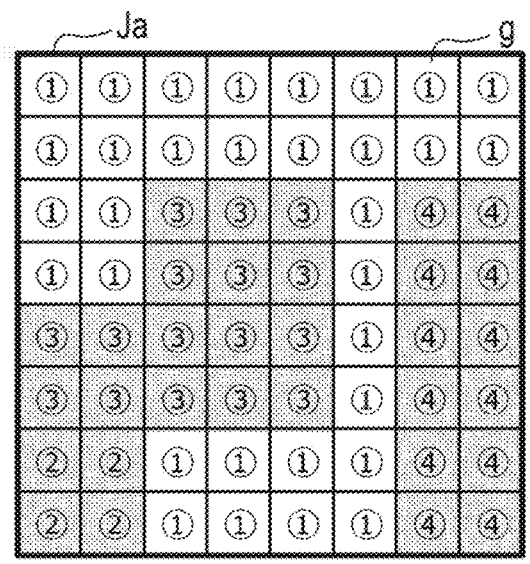

For example, a case is assumed in which when predetermined range Ja is moved on grids g, there are continuous regions of labels No. 1 to No. 4 in predetermined range Ja. Further, it is assumed that the predetermined number is set to four. At this time, since there are the predetermined number or more of continuous regions within predetermined range Ja where the predetermined number is four, data processing section 70 reduces the width of grid g to a half, and performs labeling processing C again. As illustrated in FIG. 20B, data processing section 70 recognizes a smaller region of ground surface F (label No. 1) between the continuous regions of labels No. 3 and No. 4 by reducing the width of grid g. Note that, it is configured that the rate of change of the width of grid g can be arbitrarily set. Further, in a case where the shape of a continuous region is not changed even when the width of grid g is reduced, data processing section 70 may return the width of grid g to the width of grid g before reduction.

Hereinafter, a control aspect of measurement region display system 50 will be specifically described.

Figure 21:
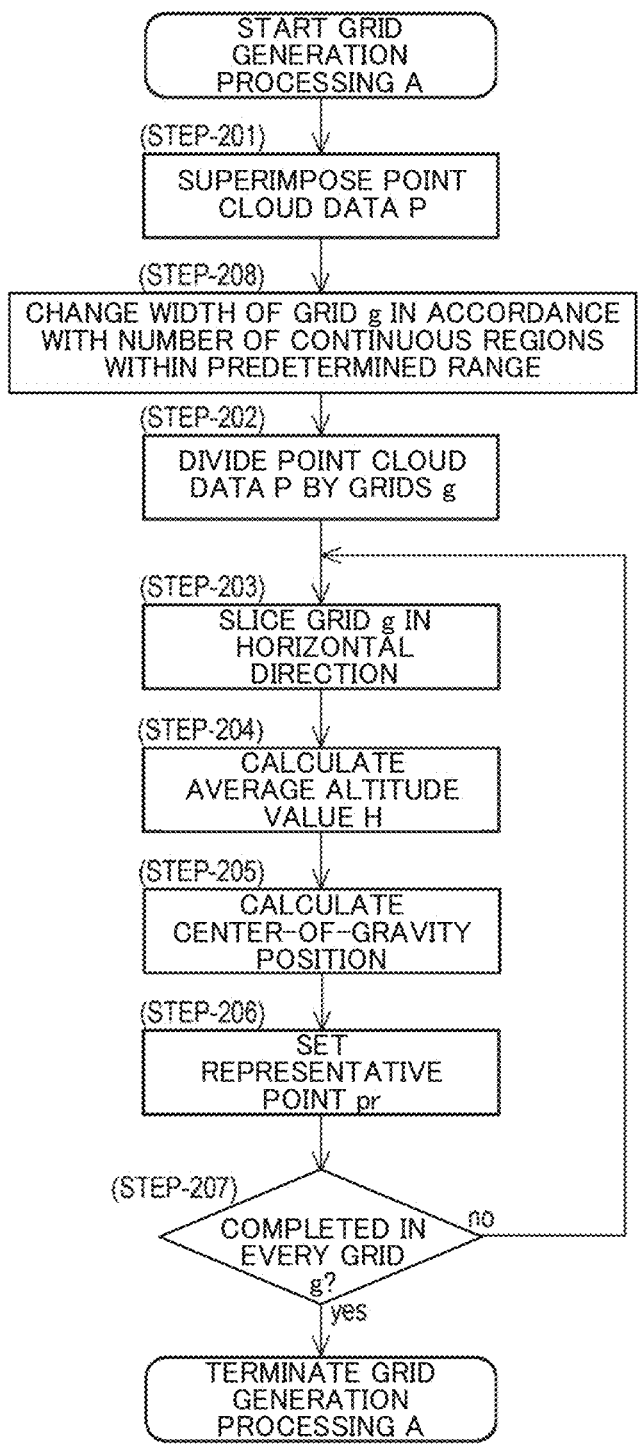
FIG. 21 is a flow diagram illustrating the grid generation processing.

As illustrated in FIG. 21, in STEP-208, data processing section 70 changes the width of grid g in accordance with the number of continuous regions within a predetermined range, and proceeds to STEP-202.

In such a ground surface estimation method, even in a case where a region of ground surface F becomes small, a smaller region of ground surface F is recognized by reducing the width of grid g. Thus, ground surface F is recognized as ground surface F that is continuous even when the height of ground surface F varies due to inclination and/or unevenness.

The embodiment described above is mere illustration of a representative embodiment, and various modifications can be implemented without departing from the spirit of one embodiment. As a matter of course, the present invention can be implemented in various other embodiments. The scope of the present invention is indicated by the appended claims, and encompasses equivalents described in the claims and all changes within the scope of claims.

INDUSTRIAL APPLICABILITY

The present invention can be utilized for a ground surface estimation method, a measurement region display system, and a crane.

REFERENCE SIGNS LIST

1 Crane
61 Camera
62 Laser scanner
70 Data processing section
F Ground surface
g Grid
H Average altitude value
KA Measurement region
p Point data
P Point cloud data
Pr Representative point

The invention claimed is:
1. A ground surface estimation method comprising:
acquiring, by a laser scanner, point cloud data by radiating laser on a measurement region, and calculating an altitude value of a radiation point from the point cloud data;
performing arithmetic processing on the point cloud data;
generating a grid by dividing the measurement region into a plurality of grids having a same size as each other, slicing each of the grids along a horizontal direction to form a plurality of layers of the measurement region partitioned with horizontal boundaries and having different altitudes, selecting, based on a predetermined condition, one layer of the measurement region from among the plurality of layers of the measurement region, calculating a center-of-gravity position and an average altitude value of the point cloud data in the selected layer for each of the grids, and setting the center-of-gravity position at the average altitude value calculated for the selected layer as a position of a representative point for each of the grids;
recognizing a continuous region in the selected layer by recognizing one grid and another adjacent grid of the plurality of grids in the selected layer as the continuous region when a difference in the average altitude value between the representative point of the one grid and the representative point of the other adjacent grid is equal to or less than a threshold, the continuous region being a region where the one grid and the other adjacent grid are continuous; and estimating a ground surface by estimating the continuous region having a largest number of the grids among the continuous regions as the ground surface.

2. The ground surface estimation method according to claim 1, wherein
in the recognizing of the continuous region, the threshold is changed in accordance with a distance between the laser scanner and the representative point.

3. The ground surface estimation method according to claim 1, wherein
in the generating of the grid, a width of the grid is changed in accordance with a number of the continuous regions within a predetermined range of the measurement region.

4. The ground surface estimation method according to claim 1, wherein
the center-of-gravity position and the average altitude value of the point cloud data are calculated for only grids in the selected layer.

5. The ground surface estimation method according to claim 4, wherein
the center-of-gravity position at the average altitude value calculated for only the selected layer is set as the position of the representative point for each of the grids in only the selected layer.

6. The ground surface estimation method according to claim 5, wherein
the continuous region is recognized in only the selected layer by recognizing the one grid and the another adjacent grid of the plurality of grids in the selected layer as the continuous region when the difference in the average altitude value between the representative point of the one grid and the representative point of the other adjacent grid is equal to or less than the threshold.

7. A measurement region display system comprising:
a data acquisition section including a laser scanner, the laser scanner acquiring point cloud data by radiating laser on a measurement region;
a data processing section configured to perform arithmetic processing on the acquired point cloud data; and
a data display section, wherein
the data processing section is further configured to:
acquire the point cloud data from the data acquisition section, and calculate an altitude value of a radiation point from the point cloud data;
divide the measurement region into a plurality of grids having a same size as each other, slice each of the grids along a horizontal direction to form a plurality of layers of the measurement region partitioned with horizontal boundaries and having different altitudes, select, based on a predetermined condition, one layer of the measurement region from among the plurality of layers of the measurement region, calculate a center-of-gravity position and an average altitude value of the point cloud data in the selected layer for each of the grids, and set the center-of-gravity position at the average altitude value calculated for the selected layer as a position of a representative point for each of the grids;
recognize one grid and another adjacent grid of the plurality of grids in the selected layer as a continuous region in the selected layer when a difference in the average altitude value between the representative point of the one grid and the representative point of the other adjacent grid is equal to or less than a threshold, the continuous region being a region where the one grid and the other adjacent grid are continuous;
estimate the continuous region having a largest number of the grids among the continuous regions as a ground surface; and
display the continuous region estimated as the ground surface on the data display section, the continuous region estimated as the ground surface being distinguished from the continuous region other than the continuous region estimated as the ground surface, and the data processing section is implemented via at least one processor.

8. A crane comprising:
a swivel base;
a boom provided on the swivel base;
a laser scanner attached to the boom and acquiring point cloud data;
a control apparatus configured to perform arithmetic processing on the acquired point cloud data; and
a display apparatus, wherein
the point cloud data for each position of the laser scanner when radiating laser is acquired by laser radiation while the laser scanner is caused to move in accordance with a swiveling operation of the swivel base, an extending and retracting operation of the boom, and/or a luffing operation of the boom,
the control apparatus is further configured to:
acquire the point cloud data for each position of the laser scanner when radiating the laser, superimpose the point cloud data for each position of the laser scanner when radiating the laser based on each position and attitude of the laser scanner when radiating the laser, and calculate an altitude value of a radiation point;
divide a measurement region into a plurality of grids having a same size as each other, slice each of the grids along a horizontal direction to form a plurality of layers of the measurement region partitioned with horizontal boundaries and having different altitudes, select, based on a predetermined condition, one layer of the measurement region from among the plurality of layers of the measurement region, calculate a center-of-gravity position and an average altitude value of the point cloud data in the selected layer for each of the grids, and set the center-of-gravity position at the average altitude value calculated for the selected layer as a position of a representative point for each of the grids;
recognize one grid and another adjacent grid of the plurality of grids in the selected layer as a continuous region in the selected layer when a difference in the average altitude value between the representative point of the one grid and the representative point of the other adjacent grid is equal to or less than a threshold, the continuous region being a region where the one grid and the other adjacent grid are continuous;
estimate the continuous region having a largest number of the grids among the continuous regions as a ground surface; and
display the continuous region estimated as the ground surface on the display apparatus, the continuous region estimated as the ground surface being distinguished from the continuous region other than the continuous region estimated as the ground surface, and the control apparatus is implemented via at least one processor.

* * * * *